United States Patent
Ito

(10) Patent No.: US 7,195,476 B2
(45) Date of Patent: Mar. 27, 2007

(54) HEATING-TYPE VACUUM PRESS APPARATUS

(75) Inventor: Hidetoshi Ito, Minowa-cho (JP)

(73) Assignee: Mikado Technos Co., Ltd., Nagano (JP)

( * ) Notice: Subject to any disclaimer, the term of this patent is extended or adjusted under 35 U.S.C. 154(b) by 378 days.

(21) Appl. No.: 10/496,963

(22) PCT Filed: May 23, 2003

(86) PCT No.: PCT/JP03/06487

§ 371 (c)(1),
(2), (4) Date: May 27, 2004

(87) PCT Pub. No.: WO03/101717

PCT Pub. Date: Dec. 11, 2003

(65) Prior Publication Data

US 2005/0089597 A1    Apr. 28, 2005

(30) Foreign Application Priority Data

May 30, 2002  (JP) .............................. 2002-156945

(51) Int. Cl.
*B29C 43/52*    (2006.01)
(52) U.S. Cl. .................. 425/388; 425/405.1; 425/407; 425/DIG. 127; 100/90
(58) Field of Classification Search ................ 425/338, 425/388, 405.1, 406–408, DIG. 127; 100/90, 100/93 P
See application file for complete search history.

(56) References Cited

U.S. PATENT DOCUMENTS 5,182,121 A   1/1993   Miyashita et al.
5,217,563 A * 6/1993   Niebling et al. .......... 425/405.1
5,297,480 A   3/1994   Miyashita et al.
5,518,385 A * 5/1996   Graff .......................... 425/388
5,540,576 A * 7/1996   Kawakita et al. ......... 425/405.1

(Continued)

FOREIGN PATENT DOCUMENTS

JP    A 63-130300    6/1988

(Continued)

*Primary Examiner*—Yogendra N. Gupta
*Assistant Examiner*—Thu Khanh T. Nguyen
(74) *Attorney, Agent, or Firm*—Oliff & Berridge, PLC

(57) ABSTRACT

A heating-type vacuum press device which has a small vacuum isolation chamber in which pressing is performed under vacuum without damage to seal packing, while heating. A lower fixed frame and an upper movement frame constitute a wall portion of the isolation chamber. A gas-tight sliding mechanism ensures gas-tightness between the lower fixed frame and the upper movement frame. Thereby, the isolation chamber is formed in a space defined by the lower fixed frame, the upper movement frame, a base and a fitting plate. The lower fixed frame surrounds a receiving table equipped with a heater for a workpiece, and is arranged on the base such that the lower fixed frame is spaced from the receiving table. The upper movement frame is hanged from the fitting plate such that the upper movement frame is spaced from a pressing plate equipped with a heater, and surrounds the pressing plate. The isolation chamber is sucked to vacuum, and a workpiece on the receiving plate is pressed under heating and vacuum at a high temperature with a low thrusting force by descending the pressing plate. The present apparatus is suitable for bonding multi-functional laminated films having high heat-resistant temperature.

15 Claims, 13 Drawing Sheets

U.S. PATENT DOCUMENTS 6,149,757 A    11/2000  Chikaki et al.

FOREIGN PATENT DOCUMENTS

| JP | A 3-128195   | 5/1991  |
| JP | A 4-332626   | 11/1992 |
| JP | A 9-141743   | 6/1997  |
| JP | A 2002-96199 | 4/2002  |
| JP | A 2002-192394| 7/2002  |

* cited by examiner

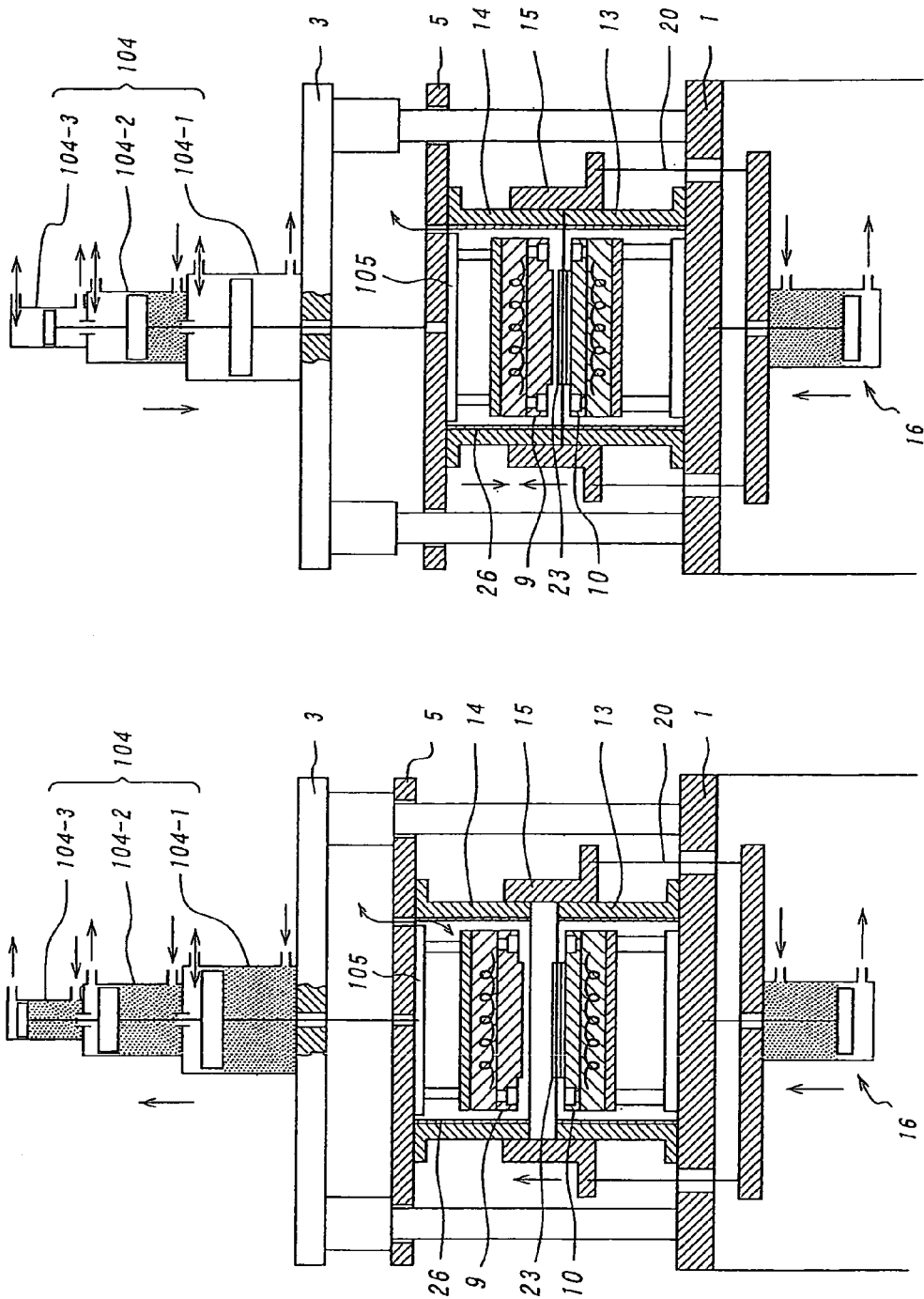

HEATING-TYPE VACUUM PRESS APPARATUS

TECHNICAL FIELD

The present invention relates to an apparatus for pressing under vacuum, while heating, in the state that an isolation chamber is formed by operating a press unit and high vacuum is realized in the isolation chamber. Particularly, the invention relates to the vacuum press apparatus suitable for pressing under high temperature and extremely low press pressure.

BACKGROUND ART

The present applicant formerly proposed a vacuum press apparatus for effecting press adhesion under heating at high vacuum while evacuation is performed, in bonding IC cards, print circuit boards, polarization lenses. See JP-A-2002-96199. In this apparatus, however, a sliding frame to form the isolation chamber is directly contacted with a jig containing a heater. Since the heat-withstanding temperature of seal packings (O-rings or the like) provided in the sliding frame is in a low temperature range of around 200° C. Therefore, such an apparatus cannot be used in case that pressing needs to be done under high temperatures higher than that temperature.

Under the circumstances, heretofore, high-temperature pressing needed to be done in a large-size fixed vacuum apparatus having an gas-tight on/off door provided with a seal packing containing a heat-resistant grease. Thus, since products need to be put into and removed from the apparatus having high interior temperature via the door, it was troublesome and very dangerous.

Further, recently, when a polarization film is to be bonded on a liquid crystal panel or a touch panel, it is necessary to prevent large press pressure from being applied onto the liquid crystal panel sealed between thin glass plates. Furthermore, when a film or a non-hardened green ceramic sheet is to be bonded onto a thin hollow frame body, a soft bonded material is deformed by pressing pressure. Thus, there is an increasing demand that bonding is effected under extremely low pressure. In addition, with progress in electronic devices, need to form laminated films each consisting of plural thin functional films has been increasing. In the case of the laminated films for condensers, if the laminated film is pressed under large press pressure until the materials are not uniformly heated, an interior vapor deposited film may be cracked or an uneven adhesive may correspondingly deform an opposing film. Therefore, it has been demanded that the laminated film is pressed under low pressure and then adhered fast by increasing the press pressure after heating.

Further, according to the conventional heating-type vacuum press bonding apparatus, workpieces to be processed need to be fed onto and removed from a workpiece-receiving table in the state that upper and lower jigs are opened from each other. Since the upper and lower jigs are provided with high-temperature heaters in a heated state, there is a danger in working, such as burn injure because a space between them is small even in the opened state.

The present invention is aimed at a heating-type vacuum press apparatus which realizes forming an isolation chamber of a narrow space inside upper and lower jigs with high vacuum through operation of the press apparatus and pressing workpieces under heating at high temperatures, without using a large-size vacuum device in which workpieces are required to be charged and removed in the state that a door is opened every time even if the workpieces need to be pressed under vacuum at high temperatures of 300 to 400° C. The invention is also aimed at preventing damage of a seal packing of a wall constituting the isolation chamber.

It is another object of the present invention to provide a heating-type vacuum press apparatus which enables pressing under heating at extremely low pressure to low press pressure.

It is a further object of the present invention to provide a heating-type vacuum press apparatus which enables workpieces to be fed onto and removed from a receiving table without working danger such as burn injury.

The present inventor has made repeated investigations, and discovered that further improvement would be preferred.

That is, when a workpiece is to be pressed under application of pressure in the vacuum heating apparatus in which the isolation vacuum chamber is to be formed, thrusting force for press processing is applied onto the workpiece. Since a large weight is applied to upper members of the isolation chamber-constituting members, the heater, a press plate, etc. under vacuum, the apparatus is suitable for pressing under high pressure as in a case where a considerable weight needs to be applied onto the workpiece.

However, as to materials to be bonded which are likely to be cracked or damaged, as in cases where films are to be bonded to film condensers, film cells, touch panels or liquid display panels or polarizing films are to be bonded onto liquid crystal glasses, press deformation is hated and high pressure pressing is hated in the state that an adhesive or a curing agent is not thermally fused. In a case of bonding soft half-cured green ceramic sheets together, there occurs a problem that the films are thinly stretched by pressing under high pressure as in a case with clay and thus a uniform thickness is not attained. Therefore, pressing needs to be performed under heating at an extremely subtle low pressure.

DISCLOSURE OF THE INVENTION

Under the circumstances, there is a vacuum press apparatus in which a cylinder mechanism for the formation of an isolation chamber is used separately with a press cylinder mechanism for pressing workpieces. In this press apparatus, however, weight of an upper press member, its fitting plate, a cylinder rod, etc. as well as an external pressure applied onto the isolation chamber due to vacuum sucking act. Thus, this apparatus is not suitable for a case where subtle adjustment and control in pressing needs to be performed with a low thrusting force as mentioned above.

Therefore, another aspect of the present invention is to provide a heating-type vacuum press apparatus which can press under heating and pressure a workpiece to be worked which requires subtle adjustment and control of pressing with the low thrusting force.

The heating-type vacuum press apparatus according to the present invention comprises (1) a base;
(2) a workpiece-receiving table arranged on the base and equipped with a heater;
(3) a lower fixed frame arranged on the base such that the lower fixed frame surrounds the receiving table, while being spaced from the receiving table;
(4) a press plate opposed to the receiving table and equipped with a heater;
(5) a fitting plate from which the press plate is hanged;

(6) a fitting plate/press plate driving mechanism adapted for vertically moving the fitting plate and the press plate and pressing the press plate on the workpiece on the receiving table by moving down the fitting plate and the press plate;

(7) an upper movement frame hanged from the fitting plate such that the upper movement frame surrounds the press plate, while being spaced from the press plate, open end faces of the upper movement frame and the lower fixed frame being opposed to each other, and the upper movement frame being approachable to or space from the lower fixed frame;

(8) a gas-tight sliding mechanism for ensuring gas-tightness between the lower fixed frame and the upper movement frame, an isolation chamber being defined by the lower fixed frame, the upper movement frame, the base and the fitting plate through the gas-tight sliding mechanism;

(9) a sliding mechanism for driving the gas-tight sliding mechanism, the sliding mechanism sliding the gas-tight sliding mechanism to form the isolation chamber; and

(10) a suction hole opened to the isolation chamber and adapted to be connected to a vacuum device, the isolation chamber being sucked to vacuum via the suction hole.

According to the heating-type vacuum press apparatus of the present invention, gas tightness is ensured between the lower fixed frame and the upper movement frame with the gas-tight sliding mechanism by the sliding mechanism, the isolation chamber is formed in the space defined by the lower fixed frame, the upper movement frame, the base and the fitting plate, the isolation chamber is sucked to vacuum via the suction hole connected to the vacuum device, the workpiece placed on the receiving table can be pressed under vacuum heating by means of the fitting plate/press plate driving unit.

According to the heating-type vacuum press apparatus of the present invention, the frame body for the formation of the isolation chamber (the lower fixed frame, the upper movement frame and the gas-tight sliding mechanism) is spaced from the heating sections with the heaters. Thus, the frame body is not influenced directly from the heating sections becoming high temperatures. Consequently, the heating-type vacuum press apparatus of the present invention enables vacuum pressing at high temperatures of e.g., 300 to 400° C. or more, for example. In a more concrete embodiment of the present invention, the frame body for the formation of the isolation chamber equipped with O-rings and other seal packings to maintain gas-tightness inside the isolation chamber is isolated from the heating sections without contacting the heating section. Thus, the frame body is not influenced directly from the heating sections becoming high temperatures.

The vacuum isolation chamber is formed by the base, the fitting plate, the lower fixed plate and the upper movement frame through descending the fitting plate toward the base. The very narrow vacuum isolation chamber can be formed by minimizing the vertical width and the planar shape of the isolation chamber for the formation of the isolation chamber. Therefore, as compared with the conventional apparatus, the vacuum pump can be miniaturized and the press apparatus itself can be made largely more compact and lighter.

The present invention is directed to the following workings, for examples.

(a) A laminated sheet of polyfunctional films having a high heat-resistant temperature in such a case where a heat-resistant film of such as a polyimide is fusion bonded, with a similar material such as a heat-resistant adhesive or a polyimide, to that surface of a thin copper sheet or stainless sheet bonded to a ceramic plate on which surface is formed an etched circuit.

(b) Package molding in which a number of chips such as condensers and resistors in a form of a laminated films are formed on a ceramic plate and the ceramic plate is wrapped with a thermosetting powdery resin through fusion (c) Heat press molding under vacuum of various kinds of engineering plastics

BRIEF DESCRIPTION OF THE DRAWINGS

FIGS. 8a and 8b are functionally illustrating views of the apparatus in FIG. 7, and show a step for forming a vacuum isolation chamber and a step for butting a lower end face of an upper movement frame to an upper end face of a lower fixed frame and undergoing vacuum sucking.

BEST MODE FOR CARRYING OUT THE INVENTION

Figure 1:
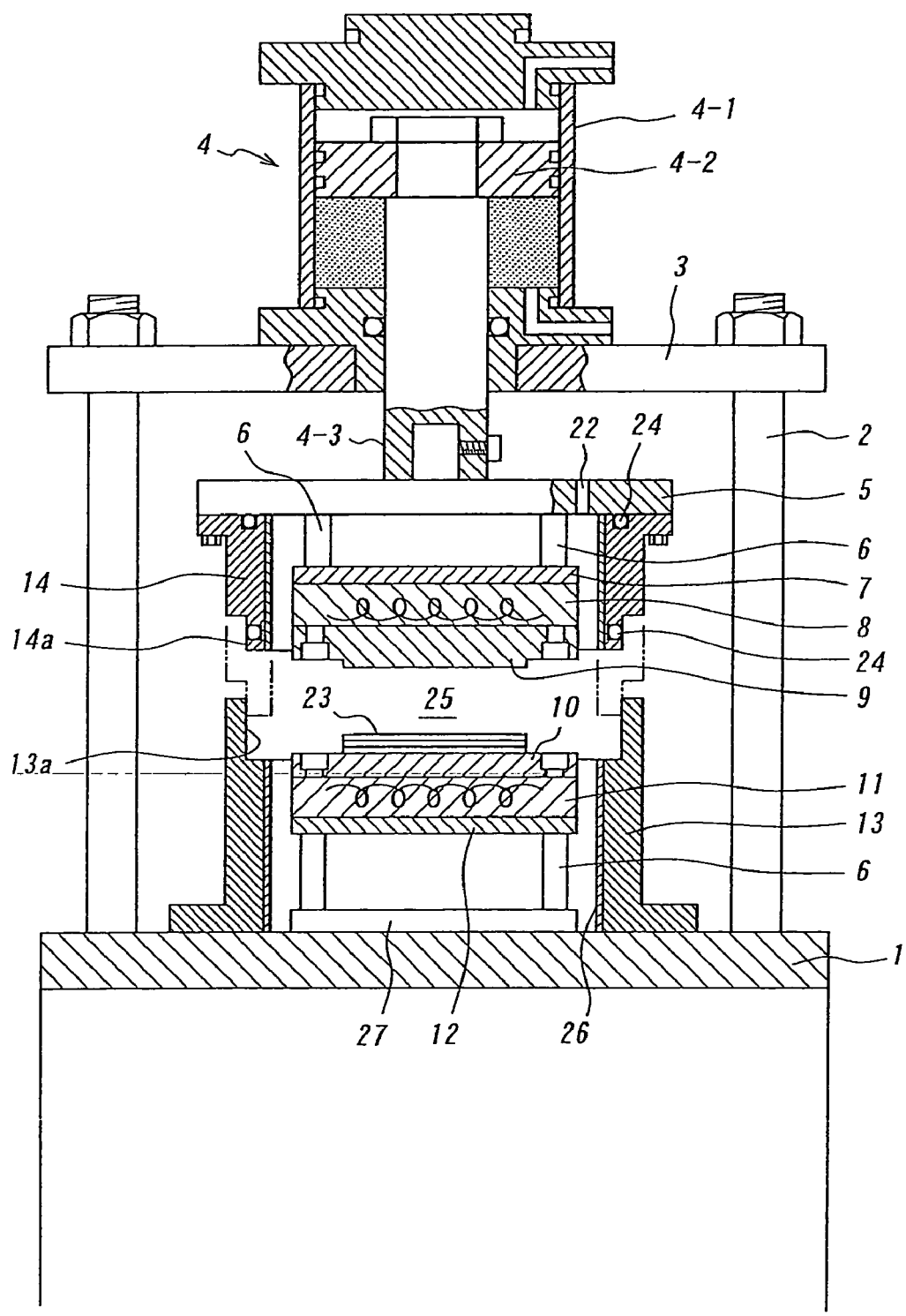
FIG. 1 is a partially sectional entire front elevation view of a first embodiment of the heating-type vacuum press apparatus according to the present invention.

Embodiments of the present invention will be explained below in more detail.

(1) Base, Workpiece -Receiving Table

The workpiece-receiving table comprises a receiving table portion having an installation face on which a generally thin workpiece is to be installed and a supporting rod supporting the receiving table above the base. A heat-insulating-plate may be interposed between the supporting rod and the receiving table. The receiving table portion may contain a built-in heater or a surface portion of the receiving table portion may be integrally bonded to a back-side heater plate. Further, it may be that the supporting rod is fixed to a supporting plate to form an integral assembly of the supporting plate, the supporting rod and the receiving table, and the assembled body is fixed to the base via the supporting plate. By so doing, the fixing of the receiving table to the base can be simplified.

(2) Press Plate, Fitting Plate, Fitting Plate/Press Plate-Driving Unit, Upper Movement Plate The fitting plate/press plate-driving unit is fixed to a machine body of a frame or the like of the vacuum press apparatus, and the fitting plate and the press plate are vertically movable by this driving unit. The press plate is hanged from the fitting plate, and the upper movement plate is also hanged from the fitting plate, while the upper movement plate is spaced from the press plate and surrounds the press plate. "Fitting plate/press plate driving unit", "hangingly provided" and "hanged" encompass the following embodiments.

(a) The fitting plate is directly connected to the fitting plate/pressing plate-driving unit, and the pressing plate and the upper movement frame are fixed directly to the fitting plate.

(b) When the fitting plate/pressing plate-driving unit is functionally connected to the pressing plate and the pressing plate is downwardly moved, the fitting plate follows the pressing plate. On the other hand, when the pressing plate is upwardly moved by the driving unit, the fitting plate is also correspondingly moved upwardly. In this case, it may be that the upper movement frame is fixed to the fitting plate so that the upper movement frame may move together with the fitting plate. Alternatively, the upper movement frame may move together with the pressing plate.

The pressing plate may be hanged from the fitting plate via a supporting rod. A heat-emitting plate may be interposed between the supporting rod and the fitting plate or between the supporting rod and the pressing plate. In the former case, the fitting plate/pressing plate-driving unit may be connected to the heat-emitting plate. The pressing plate may possess a built-in heater, or a pressing plate portion may be integrally bonded to a back-side heater plate.

(3) Suction Hole, Vacuum Device

The suction hole may be provided in any one of the fitting plate, the base, the upper movement frame, the lower fixed frame and the sliding frame constituting the isolation chamber so long as the suction hole allows the interior of the isolation chamber to be sucked to vacuum by the vacuum device.

In the following, preferred embodiments of the heating-type vacuum press apparatus according to the present invention will be exemplified. Any combination of them will be a preferred embodiment of the present invention so long as no contradiction occurs.

(1) The gas-tight sliding mechanism comprises a gas-tight sliding portion provided at an upper end of the lower fixed frame and a gas-tight sliding portion provided at a corresponding lower end of the upper movement frame, said gas tightness is ensured between the lower fixed frame and the upper movement frame by gas-tightly sliding the gas-tight sliding portion of the upper end of the lower fixed frame with that of the lower end of the upper movement frame, and the fitting plate/pressing plate-driving mechanism is used in combination as the driving unit.

(2) The gas-tight sliding mechanism is a sliding frame body vertically slidable fitted around an outer peripheral face of either the lower fixed frame or the upper movement frame, said sliding mechanism is a sliding mechanism adapted to vertically slide the sliding frame body, gas tightness is ensured among the fixed frame, the sliding frame body and the upper movement frame, the isolation chamber is formed in a space defined by the lower fixed frame body, the sliding frame, the upper movement frame, the base and the fitting plate.

The sliding frame body is slidably fitted around the outer peripheral face of either the lower fixed frame or the upper movement frame, but the isolation chamber to be sucked to vacuum is not formed in this state. The sliding mechanism slides the sliding frame body upwardly or downwardly so that gas tightness is ensured among the lower fixed frame, the sliding frame body and the upper movement frame and the insulation chamber is formed in a space defined by the lower fixed frame, the sliding frame body, the upper movement frame, the base and the fitting plate.

In the heating-type vacuum press apparatus according to the present embodiment, when the sliding mechanism slides the sliding frame body, gas tightness is ensured among the lower fixed frame, the sliding frame body and the upper movement frame, the insulation chamber is formed in the minimum space defined by the lower fixed frame, the sliding frame body, the upper movement frame, the base and the fitting plate, and the insulation chamber is sucked to vacuum through the suction hole connected to the vacuum device. Thereby, the workpiece placed on the receiving table is pressed by the fitting plate/press plate-driving mechanism under heating and vacuum.

The inner peripheral face of at least an open end of the sliding frame body is configured to closely slide with respect to the outer peripheral face of the corresponding upper movement frame or lower fixed frame. In this case, it may be that a stepped portion is provided at the open end of the outer peripheral face of the corresponding upper movement frame or lower fixed frame, and the inner peripheral face of the sliding frame body is closely slidable to the outer peripheral face of the stepped portion. For example, it may be that a stepped portion is formed at the lower end of the upper movement frame, the upper end portion of the sliding frame body is slidably butted to the stepped portion without sliding the outer peripheral face of the upper movement frame as the sliding frame body moves up.

The sliding frame body-driving mechanism can be fitted to the base or the frame above the base, for example, and be constituted by a connection rod functionally connected to the sliding frame body and a driving source such as a pushup or pushdown cylinder for vertically moving the connection rod.

(3) The press plate is connected to the fitting plate/press plate-driving mechanism. When it descends the press plate, the upper movement frame and the fitting plate move downwardly following the press plate, and the open end faces of the upper movement frame and the lower fixed frame butt to each other at the pressing position. Thereafter, the driving mechanism further descends the press plate to effect press working. On the other hand, as the driving mechanism moves the press plate upwardly, the upper movement frame and the fitting plate are moved upwardly by the press plate.

In the present embodiment, the weight of the fitting plate and the upper movement frame and loading of the external pressure based on the vacuum suction of the isolation chamber can be borne by the base via the lower fixed frame. In this case, the weight of the fitting plate, the press plate and the upper movement plate and the loading of the external pressure due to vacuum suction of the isolation chamber are supported through preliminary application of a given negative pressure (back pressure) with the fitting plate/press plate-driving mechanism, so that the workpiece needs not be pressed under vacuum based on a differential pressure between the negative pressure. Therefore, the thrusting force upon the workpiece with the press plate can be finely adjusted by the fitting plate/press plate-driving unit with a lower pressure.

(4) The fitting plate/press plate driving unit comprises a high thrusting unit and a low thrusting unit; when the press plate moves downwardly, the upper movement frame and the fitting plate move downwardly following the press plate, the open end face of the upper movement frame is butted to that of the lower fixed frame at a pressing position, the workpiece is pressed by further downwardly moving the push plate with the low thrusting unit, whereas after a vacuum state of the isolation chamber is broken, the high thrusting unit upwardly moves the press plate and the press plate upwardly moves the upper movement frame and the fitting plate.

The fitting plate/press plate-driving mechanism uses two thrusting mechanisms with different functions which are the thrusting unit for moving upwardly the press plate, the upper movement frame and the fitting plate and the low thrusting unit for press working, so that in addition to the effect in (3), the entire apparatus can be more smoothly operated, and the thrusting force upon the workpiece with the press plate can be finely adjusted under low pressure.

(5) The urging means upwardly urges the press plate so that when the press plate is brought into contact with the workpiece, the urging means may prevent weight of the press plate and the heater from being applied to the workpiece under vacuum.

Since the weight of the press plate and the heater is not applied to the workpiece by the urging means when the press plate contacts the press plate, the thrusting force upon the workpiece with the low thrusting unit can be finely adjusted under application of low pressure with higher accuracy by the low thrusting mechanism.

(6) The urging means is a balancer spring. In this case, the press plate with the heater is hanged by the balancer spring. The balancer spring undergoes preliminary initial adjustment depending upon the downward distance so that the weight of the press plate and the heater does not act upon the workpiece under vacuum by the urging means when the press plate preliminarily contacts the workpiece.

(7) The high thrusting unit and the low thrusting unit are a high thrusting cylinder mechanism and a low thrusting cylinder mechanism, respectively, and the high thrusting cylinder mechanism and the low thrusting cylinder mechanism are arranged coaxially. The high thrusting unit and the low thrusting unit are used and coaxially arranged, so that the construction of the vacuum press apparatus can be simplified.

(8) The urging means is the back pressure cylinder mechanism, and the high thrusting unit and the low thrusting unit are a high thrusting cylinder mechanism and a low thrusting cylinder mechanism, respectively. The high thrusting cylinder mechanism, the low thrusting mechanism and the back pressure cylinder mechanism are coaxially arranged. By so constructing, the construction of the vacuum press apparatus in which the thrusting force upon the workpiece with the press plate can be finely adjusted with higher accuracy under application of low pressure can be simplified.

(9) The driving unit is a servo motor mechanism. The functions of both the high thrusting unit and the low thrusting unit can be performed by setting the servo motor mechanism only. Thus, the effects in the above (4) to (6) can be obtained.

(10) The shape of an outer face of the lower fixed frame is almost identical with that of the upper movement frame, and an inner face of the sliding frame is gas-tightly slidable to the outer face of the lower fixed frame and that of the upper movement frame. By so doing, the sliding frame body can smoothly slide relative to the lower fixed frame and the upper movement frame. Preferably, the shape of the outer face of the lower fixed frame and that of the upper movement frame are of an almost identically cylindrical form, and the inner face of the sliding frame body is preferably of such a cylindrical form as to gas-tightly slide relative to the outer peripheral face of the lower fixed frame and that of the upper movement frame.

(11) A stepped portion is provided at an outer portion of the open end face of either the lower fixed frame or the upper movement frame, and an end portion of the sliding frame is slid and gas-tightly brought into contact with said stepped portion. By so constructing, the gas-tight structure can be more simply formed, because only the stepped portion has to be worked to gas-tightly slide relative to the sliding frame body.

(12) The sliding mechanism is fitted to the base, and the sliding mechanism vertically moves the sliding frame body via a connection rod. In this case, the sliding frame body is positioned at the side of either the lower fixed frame or the upper movement frame before the formation of the insulation chamber, and the sliding frame body is moved upwardly or downwardly at the time of the formation of the isolation chamber.

(13) The receiving table and the lower fixed frame are placed on the base plate via a slide table, the sliding frame is vertically slidably fitted around an outer peripheral face of the lower fixed frame, and the slide table is movable by a slide table-moving unit between a workpiece-placing position where the workpiece is placed on the receiving table and a pressing-waiting position where the workpiece is to be pressed. By so constructing, since the workpiece is fed our removed relative to the receiving table at the workpiece-placing position outside the pressing-waiting position, the products can be speedily and easily fed and removed at the wide and safety place.

(14) The receiving table, the lower fixed frame, the sliding frame body and the table plate on the slide table are fixed as an assembled unit to the slide table-moving unit, and the assembled unit is movable between the workpiece-placing position and the pressing-waiting position by the slide table-moving unit. By so constructing, the workpiece is easily movable by using such an assembled unit between the workpiece-placing position and the pressing-waiting position.

(15) The table plate holds the connection rod above the base, the sliding mechanism is located under the base and has a pushing rod at its upper portion. When said assembled unit comes to the pressing-waiting position, the connection rod upwardly moves the sliding frame via the pushing rod.

(16) A first supporting rod supports the receiving table equipped with the heater while the receiving table is spaced from the base, and a second supporting rod supports the press plate equipped with the heater while the press plate is spaced from the fitting plate.

(17) A first supporting rod supports the receiving table equipped with the heater while the receiving table is spaced from the base, and a second supporting rod supports the press plate equipped with the heater while the press plate is spaced from the fitting plate.

(18) The first rod is supported by the base via the heat-insulating-plate, and the second supporting rod is supported by the fitting plate via the heat-insulating-plate.

Embodiments of the apparatus according to the present invention will be explained with reference to the drawings.

FIG. 1 is a partially sectional front elevation view schematically and entirely illustrating one embodiment of the heating-type vacuum press apparatus according to the present invention. In the figure, a frame 3 is fixed above a base 1 by means of supporting poles 2, and a cylinder mechanism 4 is fixed on an upper side of the frame 3. The cylinder mechanism 4 comprises a cylinder 4-1, a piston 4-2 slidably fitted in the cylinder 4-1 and a rod 4-3 connected to the piston 4-2. The rod 4-3 is passed through the frame 3, and fixed to a central portion of a horizontal fitting plate 5 at its lower end. Under the fitting plate 5 are successively fixed a heat-insulating-plate 7, an upper heater plate 8 and a pressing plate 9 via a plurality of supporting rods 6, which are fixedly hanged. By the above construction, the horizontal pressing plate 9 is vertically moved by the operation of the cylinder mechanism 4.

As illustrated, a receiving table 10 as a lower jig, a lower heater plate 11 and a heat-insulating-plate 12 are attached above the base 1 via supporting rods 6, and the receiving table 10 is faced with the pressing plate 9 as a upper jig immediately above. An upper face of the receiving table 10 is wider than the lower face of the pressing plate 9 in lateral and vertical directions.

A lower fixed frame (lower frame) 13 has a tubular shape having a planar square shape (or round shape), and fixedly erected from the base 1 at such a position as surrounding the receiving table 10 from an outer side thereof and being slightly spaced from the table 10. The lower fixed frame 13 constitutes a lower wall portion of a vacuum isolation chamber 25 mentioned later.

An upper movement frame (upper frame) 14 is fixedly hanged from the lower face of the fitting plate 5 at such a position as surrounding the pressing plate 9 from an outer side and being slightly spaced from the pressing plate 9. The upper movement frame is vertically moved together with the pressing plate 9 by driving the cylinder mechanism 4. The upper movement frame 14 has a tubular shape having such a shape and such a size as being in conformity with those of the lower fixed frame 13. The upper movement frame 14 constitutes an upper wall portion of the vacuum isolation chamber 25 mentioned later.

A gas-tight sliding mechanism, which ensures gas tightness between the lower fixed frame and the upper movement frame, comprises a gas-tight sliding portion 13a provided at an upper end portion of the lower fixed frame and a gas-tight sliding portion 14a provided at a corresponding lower end portion of the upper movement frame 14. Gas tightness is ensured between the lower fixed frame and the upper movement frame when the gas-tight sliding portion 13a of the upper end portion of the lower fixed frame is gas-tightly slid relative to the gas-tight sliding portion 14a of the lower end portion of the upper movement frame. In the present embodiment, the cylinder mechanism 4 is used in combination as a sliding mechanism for driving the gas-tight sliding mechanism.

In this embodiment, an air suction hole 22 is bored in a part of the upper fitting plate 5, and the suction hole is connected to a vacuum pump (not shown) such as oil pump. When the isolation chamber 25 is formed as mentioned later, high-degree vacuum is formed by sucking air inside the isolation chamber 25.

Seal packings such as grease-containing O-rings 24 are provided at necessary portions of the lower fixed frame 13 and the upper movement frame 14 to enhance gas-tightness of the isolation chamber 25. Heat-insulating-plates 26 such as ceramic plates are provided at inner faces of the lower fixed frame and the upper movement frame. In this embodiment, a supporting plate 27 is arranged between the base 1 and the supporting rods 5.

When a workpiece 23 to be worked is pressed on the receiving table 10 under heating and pressure application at high temperature with high vacuum by using the above constructed heating-type vacuum press apparatus as in the case where a heat-resistant film is to be bonded to a circuit board with a heat-resistant adhesive, the fitting plate is first descended by driving the cylinder mechanism 4, a part of the gas-tight sliding portion 13a provided at the upper end portion of the lower fixed frame is gas-tightly slid to a part 14a of the corresponding gas-tight sliding portion 14 provided at the corresponding lower end portion of the upper movement frame 14, and thereby gas tightness is ensured between the lower fixed frame and the upper movement frame. Consequently, the isolation chamber 25 is surroundingly defined by the base 1, the fitting plate 5, the lower fixed frame 13 and the upper movement frame 14. In this state, the pressing plate 9 does not contact the workpiece 23 yet. Before the press working, the weight of the upper members including the fitting plate is supported by applying negative pressure with the cylinder mechanism.

The interior of the isolation chamber 25 is sucked to high-degree vacuum by vacuum sucking via the suction hole 22 of the fitting plate 5 by means of a vacuum pump (not shown) simultaneously with the formation of the isolation chamber. Further, the cylinder mechanism is driven, the gas-tight sliding portion 14a provided at the lower end portion of the upper movement frame 14 is slid to the gas-tight sliding portion 13b provided at the corresponding upper end portion of the lower fixed frame 13, and simultaneously with this the pressing plate 9 is descended. Finally, the pressing plate 9 presses the workpiece 23 on the receiving table 10 in the highly vacuum state. By so doing, the workpiece is pressed under heating through conduction of heat from the upper and lower heating plates 8, 11 heated to high temperatures (e.g., 300–400° C.). Thereby, a given pressing treatment is carried out onto the workpiece 23° C., for example, a heat-resistant film is thermally press bonded onto a circuit board completely free from entrapment of air bubbles.

In this embodiment, the isolation chamber is in a high-degree vacuum state which hinders conduction of heat under vacuum, the seal packings 24 in the lower fixed frame 13 and the upper movement frame 14 are spaced from the heaters 8 and 11, respectively, and the heat-insulating-plate 26 is further used. Therefore, the seal packings do not undergo high temperatures. Even if the heater portions reach 300 to 400° C., the seal packings 24 are at not more than 200, for example. Thus, use of packings of ordinary heat-resistant rubber such as fluorine rubber suffices.

After the termination of the vacuum pressing treatment under heating, the vacuum sucking hole is opened to open air, then the isolation chamber 25 is opened by pulling up the upper moving members including the upper moving parts inclosing parts increased by means of the driving unit 4, the pressed product is taken out, and a workpiece to be next processed is set, and the above operations are repeated.

Figure 2:
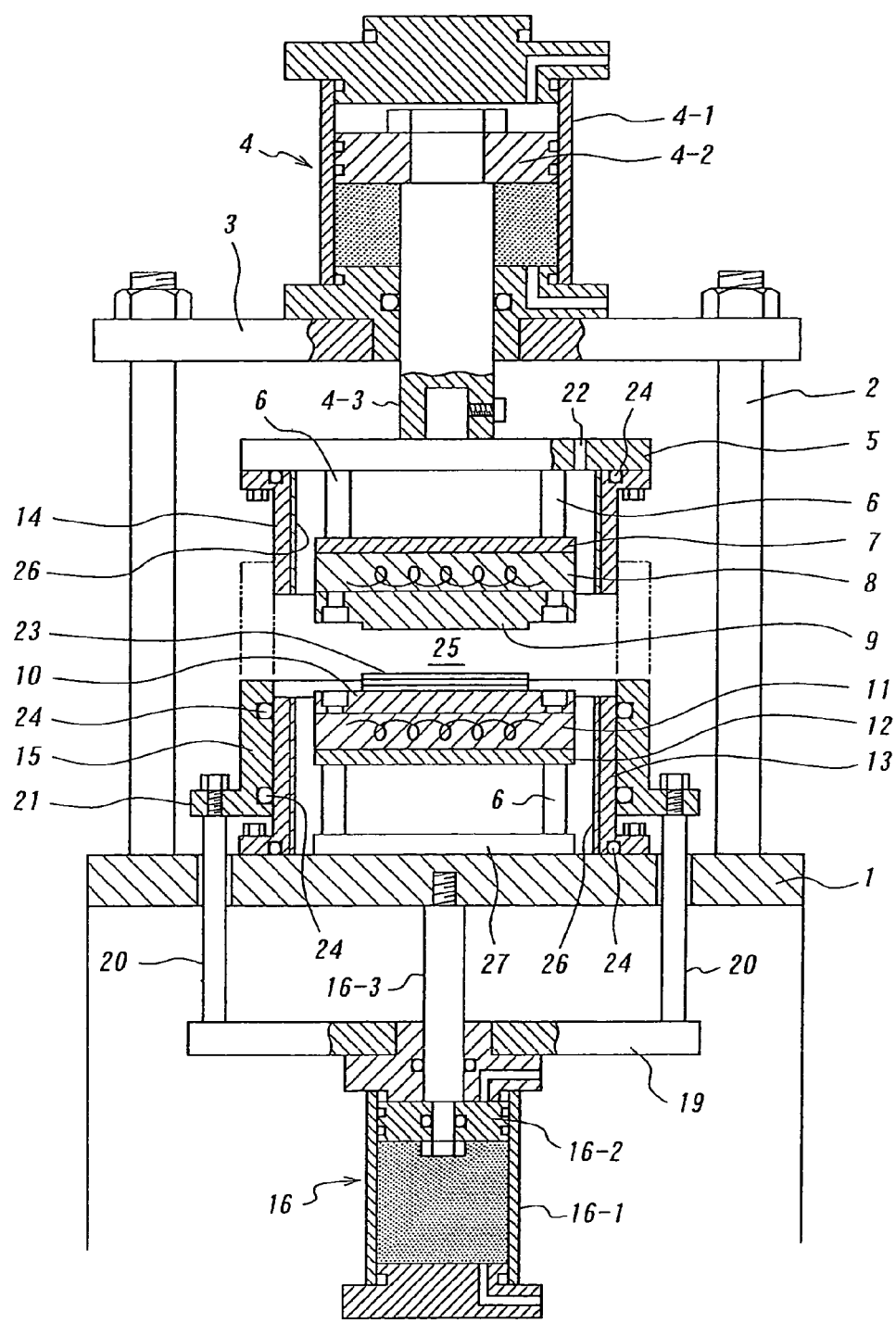
FIG. 2 is a partially sectional entire front elevation view of a second embodiment of the heating-type vacuum press apparatus according to the present invention.
Figure 3:
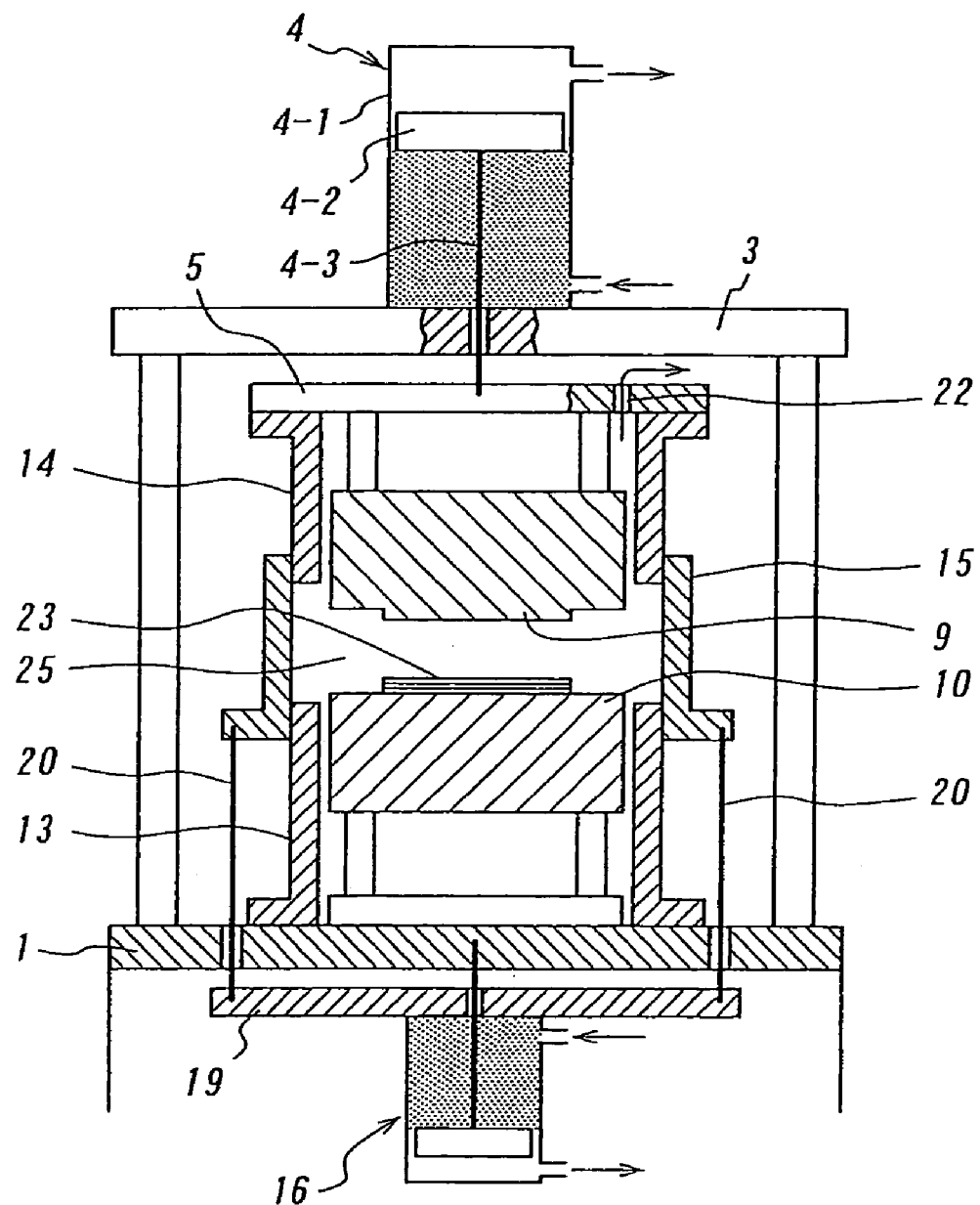
FIG. 3 is a functionally-explaining view of the apparatus of FIG. 2 showing a state that a vacuum isolation chamber is being formed.
Figure 4:
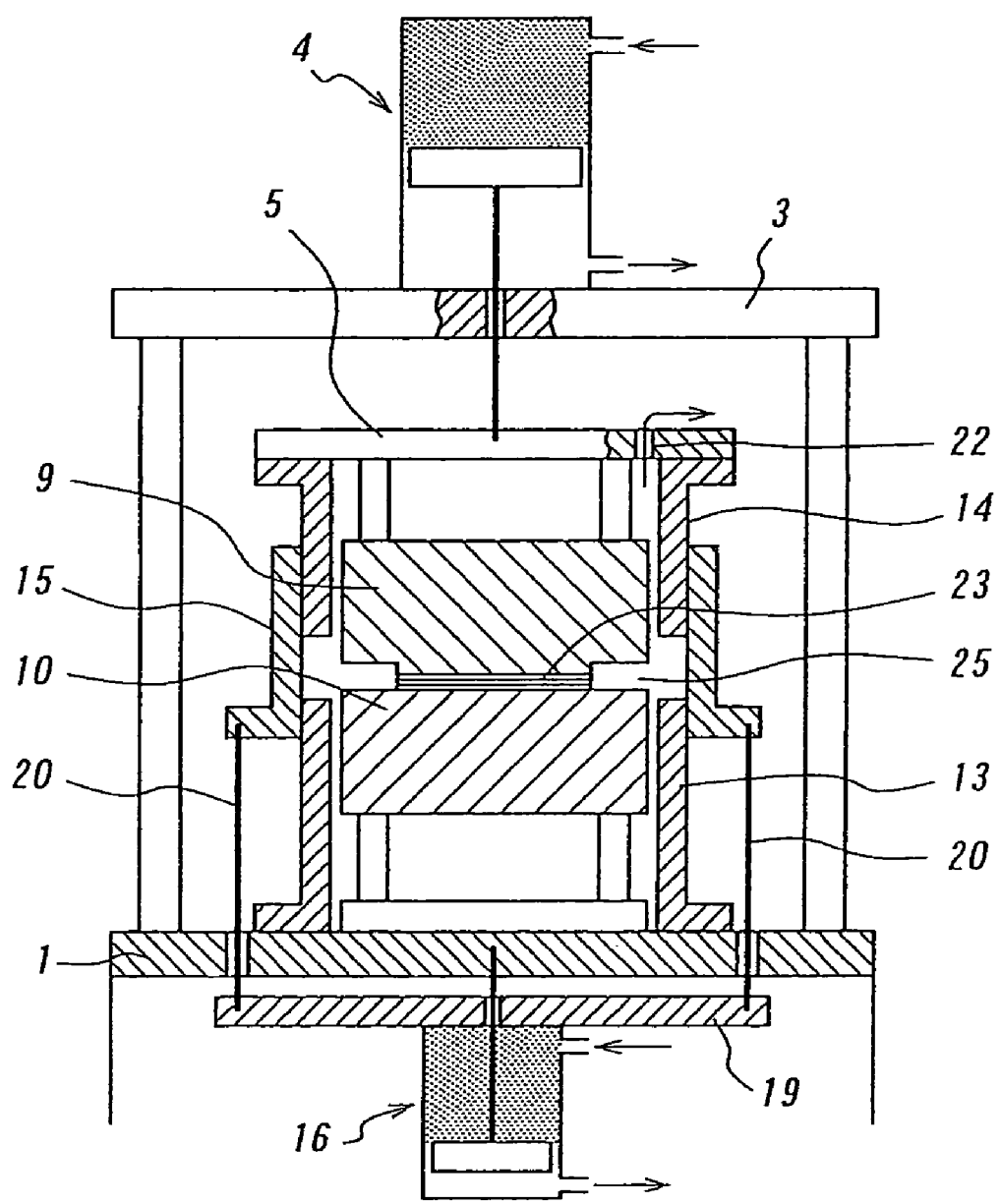
FIG. 4 is a functionally illustrating view of the apparatus in FIG. 2, showing a state that a workpiece to be processed is pressed under heating.

FIG. 2 is a partially sectional front elevation view schematically and entirely illustrating a second embodiment of the heating-type vacuum press apparatus according to the present invention, and FIGS. 3 and 4 are functionally illustrating views thereof. The same reference numerals are given to the same or similar parts as in FIG. 1, and explanation thereof will be omitted.

In the present embodiment, a gas-tight sliding mechanism is a sliding frame 15 vertically slidably fitted around the outer peripheral face of a lower fixed frame 13, and a sliding mechanism is a sliding mechanism 16 for vertically sliding the sliding frame. Gas tightness among the lower fixed frame 13, the sliding frame 15 and the upper movement frame 14 is ensured by sliding the sliding frame 15 with the sliding mechanism 16. An isolation chamber 25 is formed in a space defined by the lower fixed frame 13, the sliding frame 15, the upper movement frame 14, a base 1 and a fitting plate 5. In this embodiment, a gas-tight sliding mechanism as shown in FIG. 1 is not provided in the upper end portion of the lower fixed frame or the corresponding lower end portion of the upper movement frame.

More specifically, a pushing cylinder mechanism 16 is arranged under the base 1. The pushing cylinder mechanism 16 comprises a cylinder 16-1, a piston 16-2 sliding in the cylinder 16-1, and a rod 16-3 having an upper end fixed to the lower face of the base 1 and a lower end fixed to the piston 16-2 through a pushup plate 19 having a planar square shape. The pushing cylinder mechanism 16 is coaxial with a press cylinder mechanism 4 located thereabove.

Four connecting rods 20 penetrate the base 1, and connect four corners of an outward collar 21 formed at an outer periphery of a lower edge of the sliding frame 15 with four corners of the underlying pushup plate 19. When the rod 16-3 comes in or out relative to the cylinder 16-2 by driving the underlying pushup cylinder mechanism 16, the pushup plate 9 is moved vertically. The sliding frame 15 is vertically slid along the lower fixed frame via the connection rods 20.

When a workpiece 23 is press processed on the receiving table 10 by pressing under heating at high temperature and high-degree vacuum by using the above-constructed heating-type vacuum press apparatus, as in a case where a heat-resistant film is bonded to a circuit board, for example, with a heat-resistant adhesive, the pushup cylinder mechanism 16 is operated to retract the rod 16-3, the sliding frame 15 is upwardly slid along the outer periphery of the lower fixed frame 13 via the pushup plate 19 and the connecting rods 20. Consequently, the sliding frame 15 contacts the outer peripheral face of the upper movement frame 14 and then further slides upwardly, so that complete closure is effected between the lower fixed frame 13 and the upper movement frame by the sliding frame body 15. Thereby, an isolation chamber 25 is surrounded and formed by the base 1, the fitting plate 5, the lower fixed frame 13, the upper moving frame 14 and the sliding frame body 15 (See FIG. 3). In FIG. 3, the fitting plate is upwardly urged to be held at a vertically constant position.

Simultaneously with the formation of the isolation chamber, the interior of the isolation chamber 25 is sucked to high-degree vacuum by sucking via the suction hole 22 in the fitting hole 5 by means of a vacuum pump (not shown) (See FIG. 3), and then the pressing plate 9 is descended by driving the upper cylinder mechanism 4. When the pressing plate 9 is descended, the upper movement frame 14 is closely slid and descends along the inner periphery of the sliding frame body 15. Finally, the pressing plate 9 presses the workpiece 23 on the receiving table 10 under high-degree vacuum. Thereby, the workpiece is pressed under heating through conduction of heat from the upper and lower heater plates 8 and 11 heated to high temperatures (e.g., 300 to 400° C.), so that the workpiece 23 undergoes given press working such as thermally press bonding of the heat-resistant film onto the circuit board containing completely no bubbles (See FIG. 4). The weight of the upper moving portion including the upper movement frame and the heat-equipped pressing plate is supported by stopping air on an exhaust side (on an under side of the piston) on switching the pressure of the cylinder mechanism 4, or by descending the upper moving portion through gradually evacuating air, or by descending and stopping on the way the upper moving portion (throttled evacuation), or by feeding oil on the lower side of the piston and keeping a very small speed or stopping on the way (hydraulic throttling).

In the present embodiment, each of the seal packings 24 of the lower fixed frame 13, the upper movement frame 15 and the sliding frame body 15 is spaced from the heater portions 8 and 11, and the heat-insulating-materials 7 and 12 and the heat-emitting plate 26 are used. Thus, the seal packings do not reach high temperatures. Even if the heater portions reach 300 to 400° C., the seal packings 21 are at not more than 200° C., for example. Thus, use of packings of ordinary heat-resistant rubber such as fluorine rubber suffices.

Figure 5:
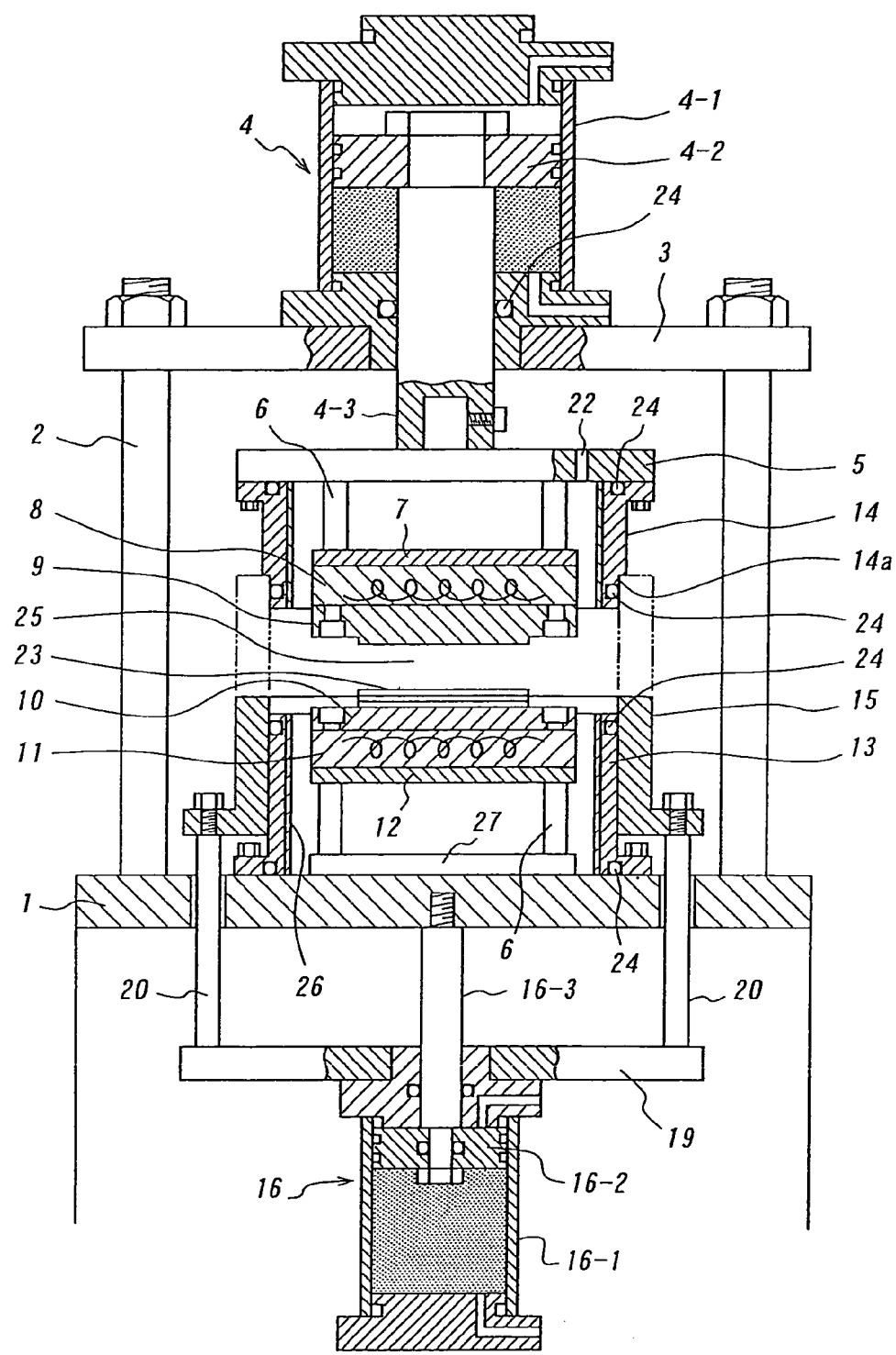
FIG. 5 is a partially sectional entire front elevation view of a third embodiment of the heating-type vacuum press apparatus according to the present invention.

FIG. 5 shows a third embodiment of the heating-type vacuum press apparatus according to the present invention. As the sliding frame body is raised by driving the pushup cylinder 16, an upper end of the sliding frame body 15 closely slidably contacts a stepped portion 14a formed at an outer peripheral portion of the lower end of the upper movement frame 14, not the outer peripheral face of the upper movement frame 14. Thereby, an isolation chamber 25 is formed.

When the isolation chamber 25 is formed in this way, vacuum sucking is immediately effected through the suction hole 22 of the fitting plate 5 and simultaneously the pressing plate 9 is descended by driving the cylinder mechanism 4. At that time, the cylinder mechanism 4 may be turned to an open state (off). Since the interior of the isolation chamber 25 is in high vacuum, there is little possibility that the sliding frame body descends due to its self weight. The pushup cylinder mechanism 16 has only to be continuously driven in a direction of raising the sliding frame body 15, so that evacuation is gradually effected. Since the pressure of the cylinder mechanism 4 is far greater than that of the pushup cylinder mechanism 16, the upper movement frame 14 can push down the sliding frame body 15 against the pushup cylinder mechanism 16.

By this, the workpiece 23 on the receiving table 10 is pressed with the pressing plate 9 under heating at high temperature in the state that the interior of the isolation chamber 25 is held under high-degree vacuum. Thereby, the workpiece 23 undergoes a given press working such as thermal press bonding.

Figure 6:
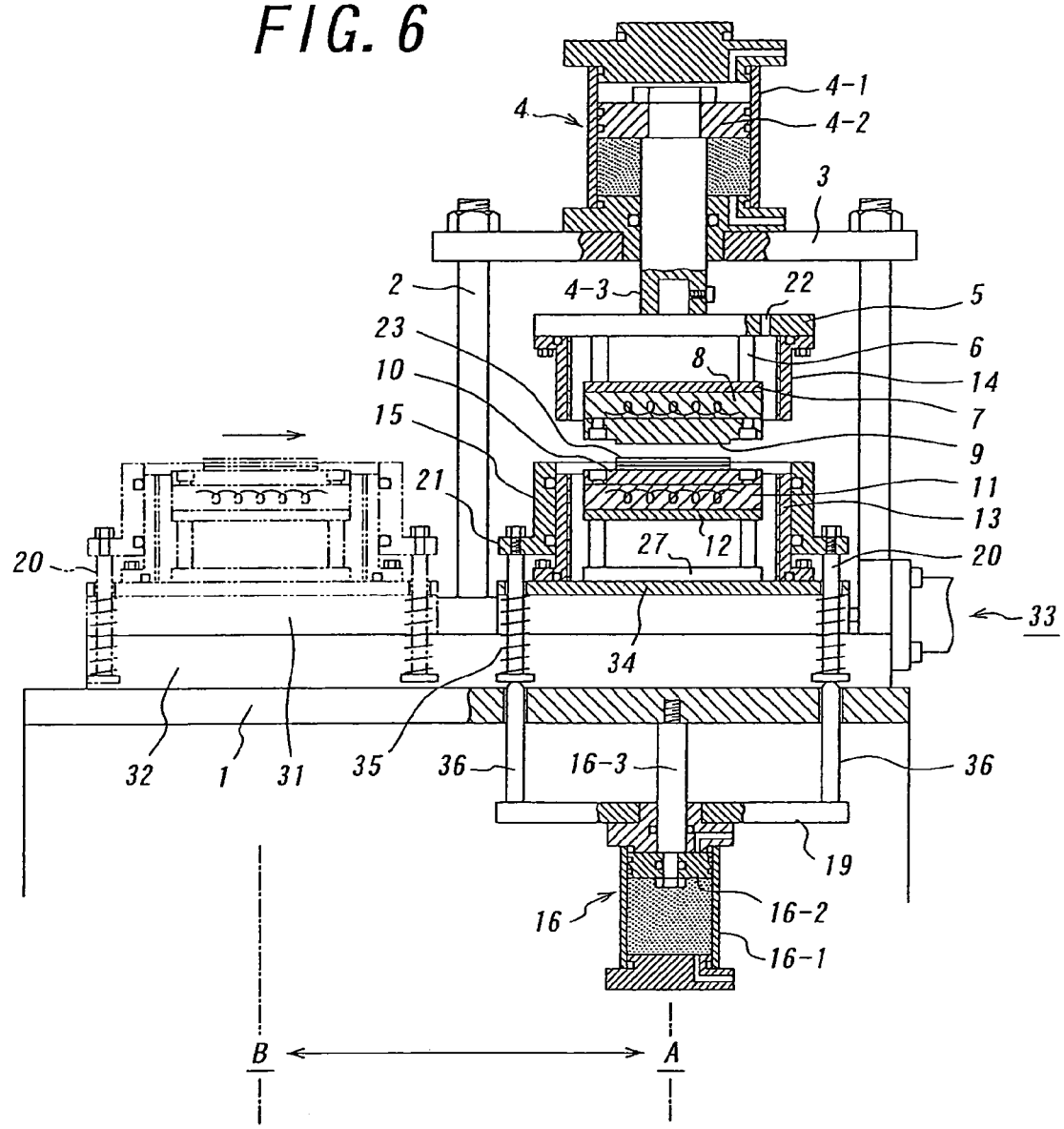
FIG. 6 is a partially sectional entire front elevation view of a fourth embodiment of the heating-type vacuum press apparatus according to the present invention.

FIG. 6 shows a fourth embodiment according to the present invention. In the first to third embodiments, the workpiece 23 needs to be fed to or taken out from the receiving table 10 as the lower jig through between the pressing plate and the receiving table in the heated condition in the state that the pressing plate is upwardly retracted. Even if the press apparatus is in the opened state, there is a danger in working such as burn injury because the space between the pressing plate and the receiving table is small. According to the fourth embodiment, a lower assembly of a receiving table 10, a lower heater 11, a lower fixed frame 13, a sliding frame body 15, etc. is arranged above a base 1, so that the lower assembly is horizontally moved to a workpiece-placing location B outside a pressing-waiting position A. Therefore, the workpiece 23 can be fed and removed speedily and easily at the wide and safety workpiece-placing location.

In FIG. 6, a slide table 31 is arranged on a guide table 32 placed on a base 1, and a horizontally moving cylinder 33 is attached to a side portion of the guide table 32. A tip of a rod of the horizontally moving cylinder mechanism 33 is fixed to such a side portion of the slide table 31 as opposed to a moving direction thereof. The slide table 31 is horizontally movable on the guide table 32 between the pressing-waiting position A and the workpiece-placing position B under the cylinder mechanism 4 by driving the horizontally moving cylinder 33.

A table plate 34 is fixed on an upper face of the slide table 31 such that the table plate extends beyond the table 31 in lateral and longitudinal directions as viewed in the paper face. On the table plate 34 are provided a receiving table 10 equipped with a lower heater plate 11 and a lower fixed frame 13 and a sliding frame body 15 outside the receiving table as constructed in the same manner as in the embodiment of FIG. 2. Connection rods 20 are fixedly hanged from an outward collar of the sliding frame body 15, and passed through front and rear extended portions of the table plate 34. Lower ends of the connection rods are urged onto an upper face of the base by respective compression springs 35, so that the sliding frame body is always downwardly urged.

Four pushup rods 36 are erected from four corners of the pushup plate 19, and their tip portions are inserted through holes provided in the base 1, and contacted with lower end faces of the connection rods 20. The lower pushup cylinder mechanism 16 is driven to push the rod 16-3 into or out of the cylinder 16-1 via the cylinder piston 16-2, so that the pushup plate 19 is vertically slidably moved to ascend or descend the pushup rod, thereby vertically slide the sliding frame body 15 along the lower fixed frame via the connecting rod 20.

According to the vacuum press apparatus of FIG. 6, a rod of the horizontally moving cylinder mechanism 33 on a side is extended outwardly to slidably move the slide table 31 from the pressing-waiting position A under the cylinder 4 to the workpiece-placing position B on the outer side (to the left in FIG. 6), and a workpiece 23 is placed on the receiving table 10 at this position B. Next, the slide table is returned immediately under the cylinder mechanism 4 by the above cylinder mechanism 33, and the sliding frame body 15 around the outer periphery of the lower fixed frame 13 is slid up by the pushup cylinder mechanism 16 via the pushup rod 36 and the connection rod 20 at a position where the connecting rod 20 is aligned with the pushup rod 36. Then, an upper portion of the sliding frame body 15 is contacted and slid to the outer periphery of the upper movement frame 14, and an isolation chamber 25 is formed inside them. Thereafter, the interior of the insulation chamber 25 is sucked to high vacuum, and the cylinder mechanism 4 is driven to descend the pressing plate 9, which makes given pressing treatment on the workpiece 23 on the receiving table 10 under heating.

In the apparatus of FIG. 6, it goes without saying that instead of the system in which the sliding frame body 15 is raised to slide contact with the outer periphery of the upper movement frame 14, a stepped portion may be formed at a lower peripheral edge of the upper movement frame 14 so that an upper end of the sliding frame body 15 may come and gas-tightly slide into the stepped portion.

After the termination of the predetermined press working, the isolation chamber 25 is released to the atmospheric pressure, the pushup cylinder 16 is driven back (extension of the rod), the sliding frame body 15 is pulled down to a descending end by the spring force of the compression spring 35. Then, the horizontally moving cylinder mechanism 33 is driven to move the slide table 31 from the pressing-waiting position A to the workpiece-placing position B on the side (left side). The press worked workpiece 23 on the receiving table 10 is removed, and a fresh workpiece is set on the receiving table.

According to the above construction of the apparatus of the present invention, the isolation chamber having a high-degree vacuum can be easily formed by the vertically movable sliding frame body at the position spaced from the upper and lower heater portions, so that even if the upper and lower heaters are always at high temperatures, the workpieces can be easily and safely fed and removed in the opened state that the sliding frame body is descended.

When the lower jig portion is mounted on the slide table as in the apparatus of FIG. 6, the product can be automatically fed to or removed from the receiving table at the place outside the pressing unit. Thus, the pressing working can be entirely automated.

Figure 7:
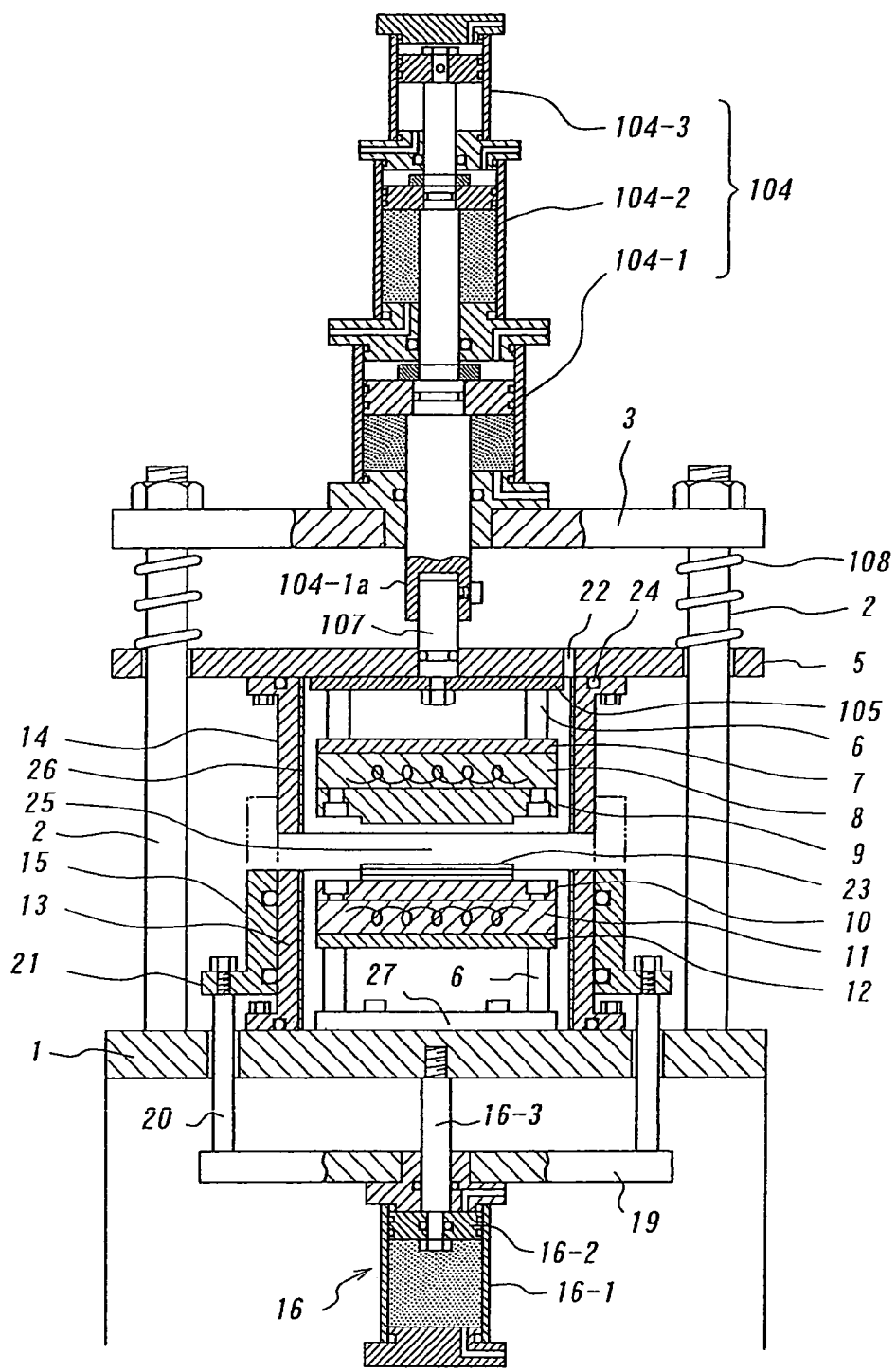
FIG. 7 is a partially sectional entire front elevation view of a fifth embodiment of the heating-type vacuum press apparatus according to the present invention.
Figure 9A:
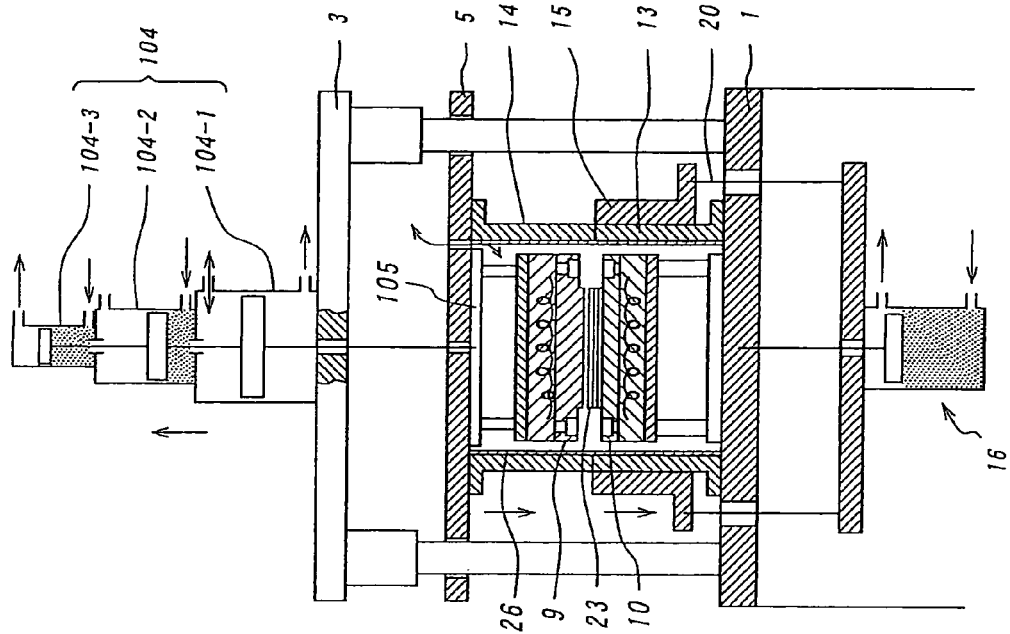
FIGS. 9a and 9b are functionally illustrating views of the apparatus in FIG. 7, and show a step for pressing a workpiece to be worked and a step for pulling up the workpiece, respectively.
Figure 9B:
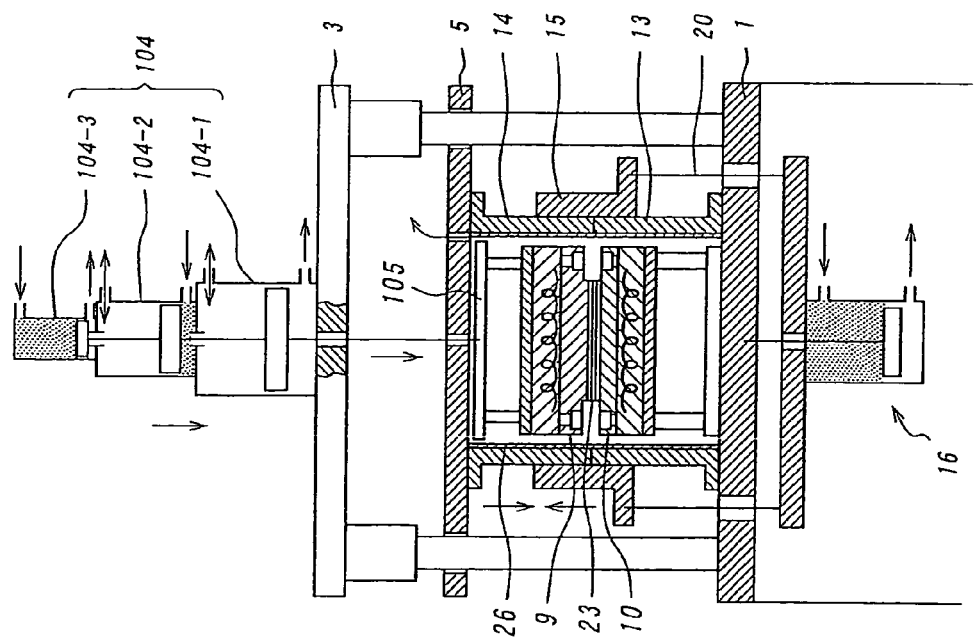

FIG. 7 is a partially broken front elevation view of a fifth embodiment of the heating-type vacuum press apparatus according to the present invention, and FIGS. 8a and 8b and FIGS. 9a and 9b are functionally illustrating views thereof. In this embodiment, a pressing plate is upwardly urged by a balancing cylinder mechanism for exclusive use thereof, and the weight of the pressing plate and a heater is prevented from being applied to a workpiece by the balancing cylinder mechanism when the pressing plate contacts the workpiece. In the following, featuring portions of this embodiment will be explained, while explanation of overlapping portions is omitted.

In the present embodiment, a driving unit 104, which is arranged on a supporting frame 3, comprises a high-pressure, large-diameter pull-up cylinder mechanism 104-1, a medium-pressure, medium-diameter balancing cylinder mechanism 104-2 and a low-pressure, small-diameter pressurizing cylinder mechanism 104-3, which are placed one upon another successively in series. Each cylinder comprises a cylinder, a piston and a piston rod. The piston rods are connected together in series via the piston. In this embodiment, the high-pressure cylinder mechanism, the medium-pressure cylinder mechanism and the low-pressure cylinder mechanism are successively placed one upon another from the lower to the upper sides. This arranging order may be arbitrary changed. Further, in this embodiment, the piston rods are fixedly connected together, but they may be separated from one another so long as they are arranged coaxially.

A fitting plate 5 is pulled up by the pull-up cylinder mechanism 104-1 via a supporting plate 105. In the figure, a lower end of the rod 104-1 of the pull-up cylinder mechanism and the supporting plate 105 are connected with a shank (connecting jig) 107. The shank 107 is gas-tightly slidable through a through-hole of the fitting plate. In FIG. 7, a reference numeral 108 denotes a compression spring fitted around a guide post between the supporting frame 3 and the fitting plate 5.

In the following, the pull-up cylinder 104-1, the medium-pressure cylinder mechanism 104-2 and the low-pressure cylinder 104-3.

After the vacuum is broken by sliding the sliding frame body, following the given pressing treatment under heating inside vacuum isolation chamber, the pull-up cylinder mechanism 104-1 pulls up the entire upper moving portion including the fitting plate 5, the upper movement frame 14, the supporting plate 105, the supporting rods 6, the heat-insulating-plate 7, the upper heater 8 and the pressing plate 9.

The medium-pressure balancing cylinder mechanism 104-2 is controlled to exert such a back pressure as to support the total weight of the moving portion movable under the fitting plate 5, that is, the supporting plate 105 and the supporting rods 6, the heat-insulating-plate 7, the heater 8, the pressing plate 9 (as well as the cylinder rod 104-1a, the shank 107), etc. under vacuum. In this case, it may be that the back pressure of the balancing cylinder mechanism is made slightly larger than the total weight to exert a force in a hanging-up direction. The medium-pressure balancing cylinder mechanism 104-2 makes balancing with the above total weight.

The low-pressure cylinder mechanism 104-3 presses the working piece 23 on the receiving table 10 under vacuum heating. Since the medium-pressure balancing cylinder mechanism 104-2 makes balancing with the total weight of the pressing plate 9, etc., a slight pressing pressure of the low-pressure cylinder mechanism is applied to the pressing plate 9 as it is.

The present embodiment is particularly suitable for workpieces which dislike cracking breakage, performance damaging, non-uniform thickness and adhesive smudge, as in cases of laminating and bonding chip-containing IC cards, vapor-deposited film condenser films, thin glass liquid crystal displays, soft ceramic green sheets, etc.

Operation of the present embodiment will be explained.

First, a workpiece 23 is placed on the receiving table 10, the underlying pushup cylinder mechanism 16 is driven to retract the rod 16-4 into the cylinder 16-1 and thereby slidingly raise the sliding frame body 15 along the outer peripheral face of the lower fixed frame 13 via the connecting rods. The upper end of the sliding frame body 15 contacts the lower end of the upper movement frame 1, and further slides up to make complete closure between the lower fixed frame 13 and the upper movement frame 14. Thereby, the isolation chamber 25 is formed by the base 1, the lower fixed frame 13, the sliding frame body 15, the upper movement frame 14 and the fitting plate 5.

In this state, a back pressure is applied to the balancing cylinder mechanism 104-2 to float the upper moving portion, whereas the pull-up cylinder mechanism 104-1 and the low-pressure pressing cylinder mechanism 104-3 are released, and the interior of the isolation chamber 25 is sucked to vacuum via the suction hole 22 of the fitting plate 5 by means of a vacuum pump (not shown). Thereby, the upper movement frame 14 and the fitting plate 5 descend due to their self weights and vacuum-sucking force, and the lower end face of the upper movement frame 14 press contacts the upper end face of the lower fixed frame 13. See FIG. 8b. While air is blown into the balancing cylinder 104-2 from an underside, only an output to support the moving portion vertically movable separately from the fitting plate 5 and the upper movement frame body, i.e., the heater-equipped pressing plate 9, the supporting plate 105, etc. inside the upper movement frame 14 is applied to the cylinder mechanism 104. Thus, the self weights of the fitting plate 15 and the upper movement frame 14 cannot be supported, so that the entire upper moving portion descends due to the vacuum suction force and the self weights.

Even if the lower end face of the upper movement frame 14 press contacts the upper end face of the lower fixed frame 13, the pressing plate 9 does not contact the workpiece 23 yet. See FIG. 8b. However, the interior of the isolation chamber 25 which is being sucked to vacuum in this state is in high-degree vacuum, any bubble in the workpiece is removed.

Next, while the pull-up cylinder mechanism 104-1 is kept opened, the upper small-diameter, low-pressure pressing cylinder mechanism 104-3 is driven to push down the supporting plate 105 under the fitting plate 5. Thereby, the pressing plate 9 is contacted with the workpiece 23, which is pressed under vacuum, while being heated. See FIG. 9a. At that time, since the weight of the pressing plate 9, the supporting plate 105, etc. is held by the balancing cylinder mechanism 104-2, that weight does not exert upon the workpiece 23 at all under vacuum, and only a thrusting force of the low-pressure pressing cylinder mechanism exerts upon the workpiece. The workpiece 23 can be pressed under extremely low pressure by appropriately selecting the low-pressure pressing cylinder mechanism.

As mentioned above, after the pressing treatment of the working piece 23 under heating in bonding a film under low pressing pressure, for example, is completed, vacuum suction via the suction hole 22 is stopped, and the isolation chamber 25 is immediately returned to the atmospheric pressure. Further, the pushup cylinder mechanism 16 is reversely driven to extend the rod 16-3 outwardly and slide down the sliding frame body 15 to the original position. Furthermore, simultaneously with this, the upper low-pressure pressing cylinder 14-3 is reversely driven to contact the supporting plate 105 hanging the pressing plate 9 with the lower face of the pressing plate 5. Further, the pull-up cylinder 104-1 is driven to pull up the fitting plate 5 (See FIG. 9b), and return it to the original position as shown in FIG. 7.

The pull-up cylinder mechanism 104-1 is principally used to pull up the entire upper moving portion. Depending upon workpieces, a further pressing with a greater thrusting force under pressure may be required after low-pressure pressing under heating with the low-pressure pressing cylinder mechanism. In such a case, the pull-up cylinder mechanism 104-1 may be driven in a pull-down direction.

According to this embodiment, the cylinder mechanism on the upper side of the supporting frame is a cylinder mechanism in which the pull-up cylinder mechanism 104-1 for pulling upwardly the entire upper moving portion, the balancing cylinder mechanism 104-2 and the low-pressure pressing cylinder mechanism 104-3 are vertically in series. Since the pressing members such as the heater-equipped pressing plate 9, its supporting plate 105, etc., which are separately driven inside the upper movement frame 14, are always supported by the balancing cylinder 104-2, the workpiece 23 can be pressed with an extremely low pressure by the low-pressure pressing cylinder mechanism 104-3 under vacuum, while being heated.

Figure 10:
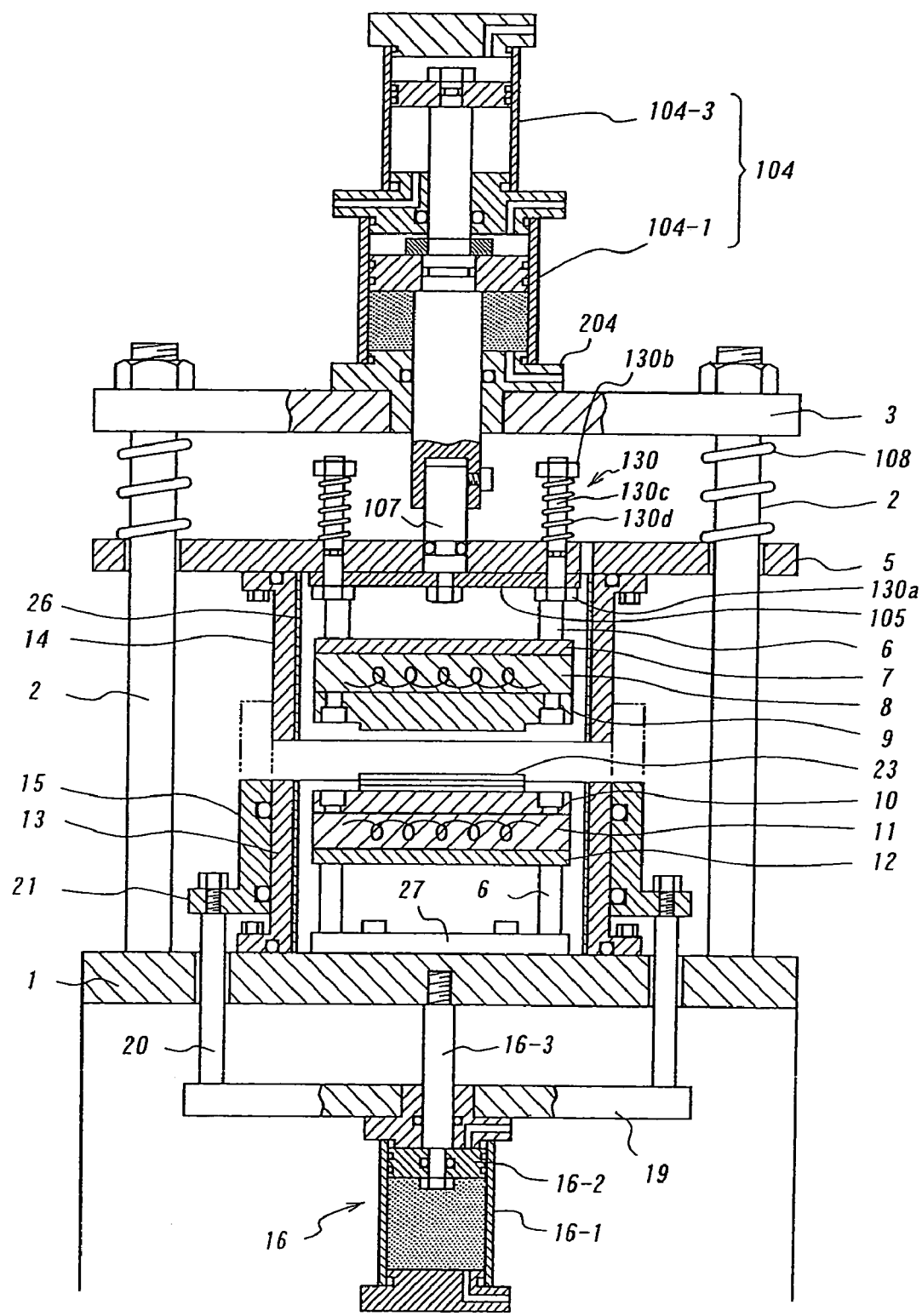
FIG. 10 is a partially sectional entire front elevation view of a fifth embodiment of the heating-type vacuum press apparatus according to the present invention.

FIG. 10 is a partially sectional elevation view of a sixth embodiment of the heating-type vacuum press apparatus according to the present invention, and FIGS. 11a and 11b and FIGS. 12a and 12b are schematically illustrating views of its operations. In the fifth embodiment, the weight of the moving portion inside the upper movement frame is supported by the balancing cylinder mechanism under the fitting plate. The sixth embodiment differs from the fifth one in that the former uses a balancing spring mechanism instead of the balancing cylinder mechanism. The other constituent features are identical between the fifth and sixth embodiments. In the following, only constituent features of the sixth embodiment which differ from those of the fifth one will be explained.

In the sixth embodiment, the driving unit 104 comprises a pull-up cylinder mechanism 104-1 and a low-pressure pressing cylinder 104-3. Four balancing spring mechanisms 130 are provided, which gas-tightly pass a fitting plate 5 and a supporting plate 105 at four corners, respectively. Each spring mechanism 130 possesses an opposite end slippage-preventing end (for example, a head portion 130a of a bolt and an adjusting nut 130b positioned in an upper portion), a guide rod 130c gas-tightly passing through the fitting plate 5 and the supporting plate 105, and a compression spring 130d coiled around the guide rod between the fitting plate 5 and the adjusting nut 130b at the end of the guide rod 130c.

In the present embodiment, the entire weight of the moving portion (a supporting plate 105, the supporting rod 6, a heat-insulating-plate 7, an upper heater 8 and a pressing plate 9) inside the upper movement frame under and by the fitting plate 5 by the balancing spring mechanism 130. The supporting plate 105 is upwardly urged to always contact an under face of the fitting plate 5. The holding force is adjustable by the adjusting nut 130 of the guide rod 130c.

In this embodiment, the compression spring 130d is coiled around the guide rod between the fitting plate 5 and the adjusting nut 130d of the guide rod 130a. The compression spring may be coiled between the lower face of the fitting plate 5 and the head portion 130a of the rod 130.

Next, the operation of the sixth embodiment will be explained.

After a workpiece 23 is placed on the receiving table 10, the sliding frame body 15 is slid upwardly along the outer peripheral face of the lower fixed frame 13 to make complete closure between the lower fixed frame 13 and the upper movement frame 14. Thereby, an isolation chamber 25 is formed by the base 1, the lower fixed frame 13, the sliding frame body 15, the upper movement frame 14 and the fitting plate 5. See FIG. 11a.

In this state, the moving portion including the pressing plate 9 inside the upper movement frame is held under and by the fitting plate 5 by means of the balancing spring mechanism 130. The entire upper moving portion including the moving portion, the fitting plate 5, etc. is held by the pull-up cylinder mechanism 104-1 while being urged upwardly. See FIG. 11a.

Figure 11A:
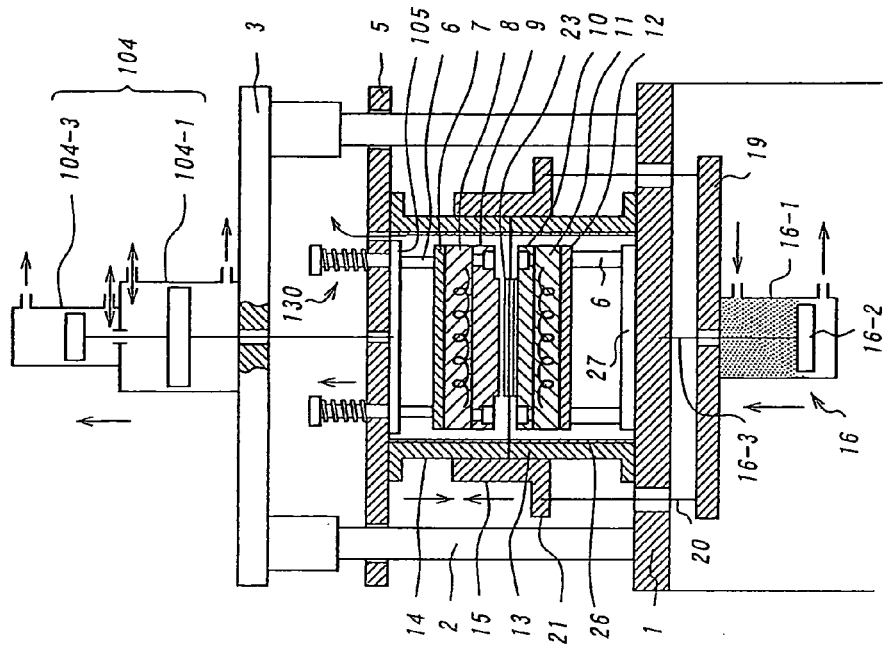
FIGS. 11a and 11b are functionally illustrating views of the apparatus in FIG. 10, and show a step for forming a vacuum isolation chamber and a step for butting a lower end face of an upper movement frame to an upper end face of a lower fixed frame and subjecting the vacuum isolating chamber to vacuum sucking, respectively.
Figure 11B:
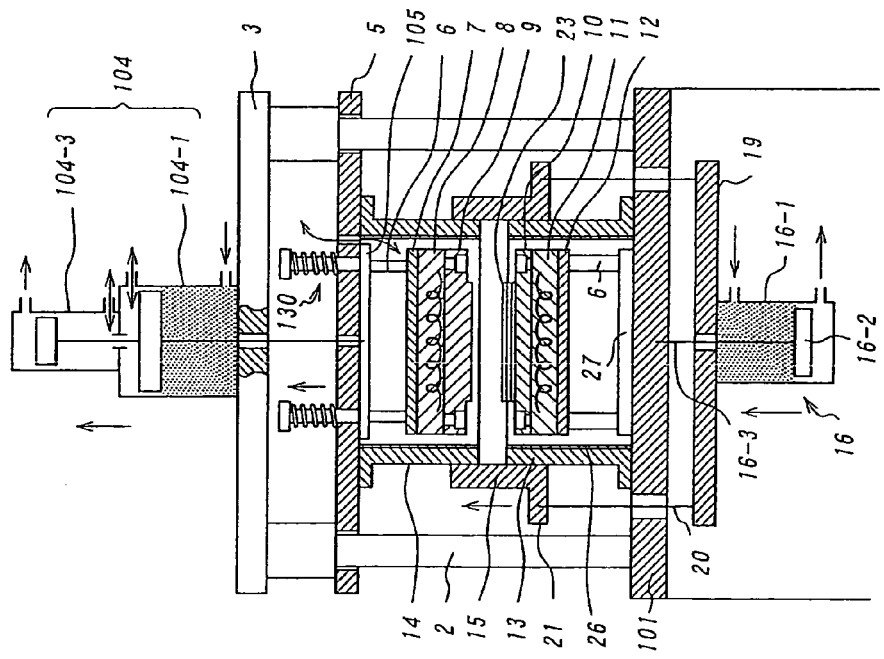

Next, as shown in FIG. 11b, the pull-up cylinder mechanism 104-1 and the low-pressure pressing cylinder mechanism 104-3 are released, and simultaneously the interior of the insulation chamber 25 is sucked to vacuum via the suction hole 22 of the fitting plate 5 with a vacuum pump (not shown). Thereby, the upper movement frame 14 and the fitting plate 5 descend due to their self weights and the vacuum suction force, so that the lower end face of the upper movement frame 14 contacts the upper end face of the lower fixed frame 13. See FIG. 11b.

Even when the lower end face of the upper movement frame 14 contacts the upper end face of the lower fixed frame 13, the pressing plate 9 does not contact the workpiece 23 yet. In this state, since the interior of the isolation chamber 25 which is being sucked to vacuum is in high-degree vacuum, any bubble in the workpiece 23 is removed.

Figure 12A:
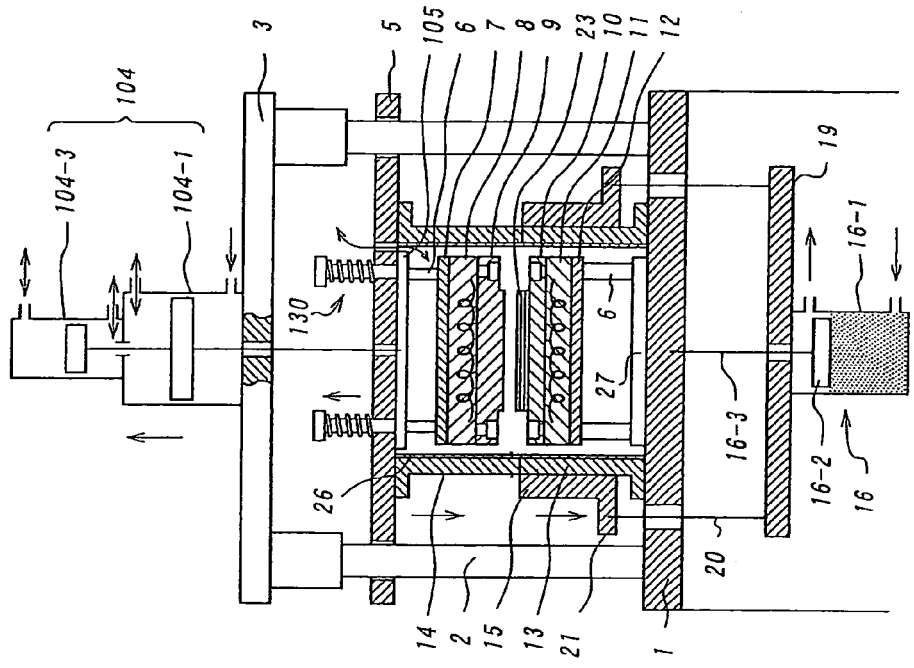
FIGS. 12a and 12b are functionally illustrating views of the apparatus in FIG. 7, and show a step for pressing a workpiece to be worked and a step for pulling up the workpiece, respectively.
Figure 12B:
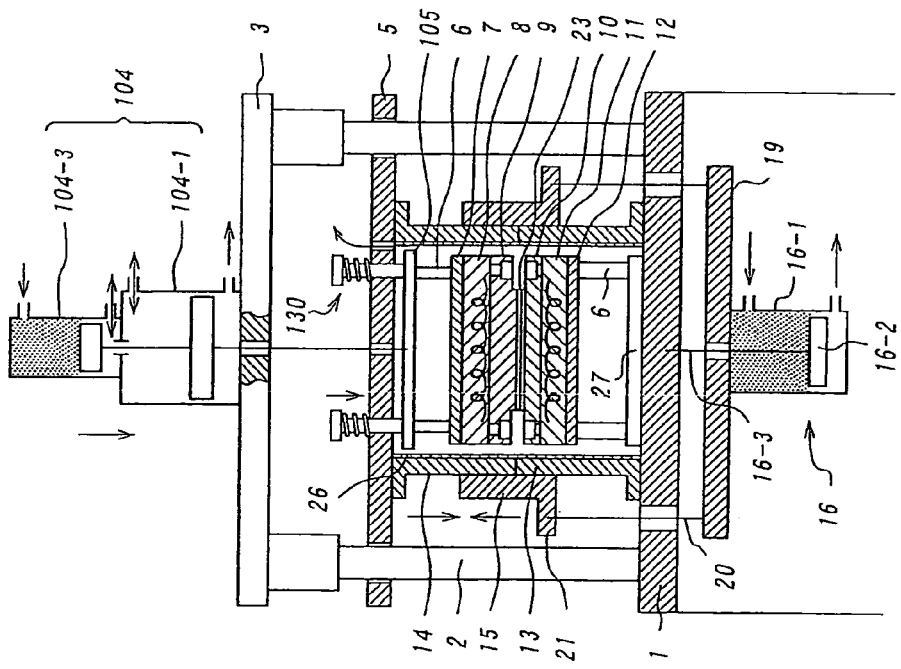

Next, as shown in FIG. 12b, while the pull-up cylinder mechanism 104-1 is kept released, the upper small-diameter, low-pressure pressing cylinder mechanism 104-3 is driven to push down the supporting plate 105 under the fitting plate 15, so that the pressing plate 9 is contacted with the workpiece 23 and the workpiece is pressed with low press pressure under vacuum, while being heated. See FIG. 12a. At that time, since the weights of the pressing plate 9, the supporting plate 105, etc. are held at the fitting plate 5 by means of the balancing spring mechanism 130, none of their weights act upon the workpiece 23, and only a thrusting force of the low-pressure pressing cylinder mechanism 104-3 is applied thereto.

After the pressing treatment of the workpiece 23 under heating, such as bonding of a film with low press pressure is completed, vacuum sucking through the suction hole 22 is stopped, the isolation chamber 22 is immediately returned to the atmospheric pressure, and the sliding frame body 15 is downwardly slid to its original position. Further, the supporting plate 105 hanging the pressing plate 9 is contacted with the lower face of the fitting plate 5 by the balancing cylinder mechanism 130, and the pull-up cylinder 104-1 is driven to pull up the fitting plate 5 (See FIG. 12b) to the original position shown in FIG. 10.

According to this embodiment, the cylinder mechanism on the upper side of the supporting frame is a cylinder mechanism in which the pull-up cylinder mechanism 104-1 for pulling up the entire upper moving portion and the low-pressure pressing cylinder mechanism 104-3 are vertically arranged in series, and the moving portion under the fitting plate 5 is always upwardly held by the spring mechanism inside the upper movement frame 14. Thus, when the workpiece is to be pressed with the low-pressure pressing cylinder mechanism 104-3, pressing can be performed with an extremely low thrusting force under vacuum, while being heated.

Figure 13:
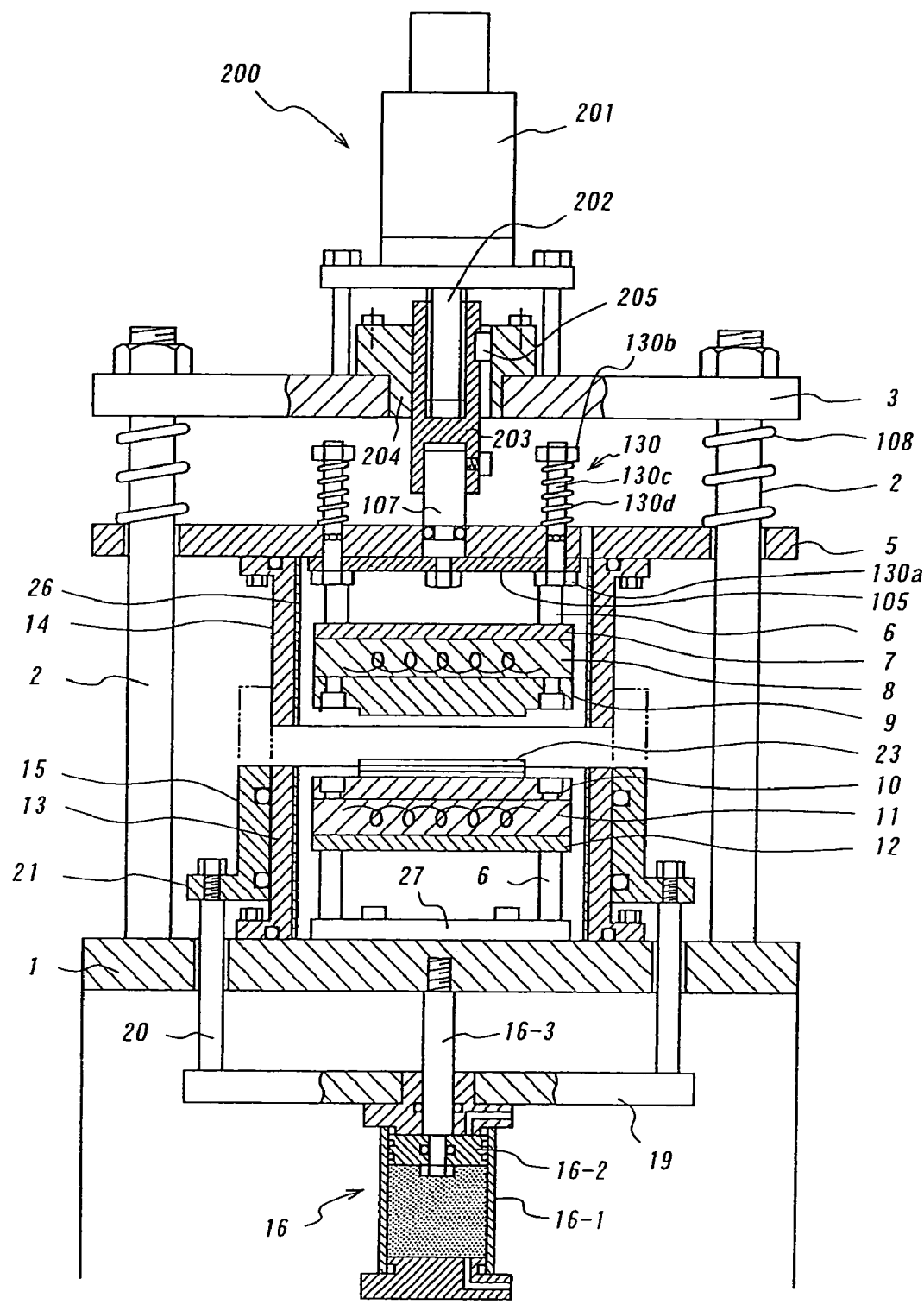
FIG. 13 is a partially sectional entire front elevation view of a seventh embodiment of the heating-type vacuum press apparatus according to the present invention.

FIG. 13 is a partially sectional elevation view of a seventh embodiment of the heating-type vacuum press apparatus according to the present invention. This embodiment is the same as the sixth one except that the cylinder mechanism 104 in the sixth embodiment of FIG. 10 is replaced by a servo motor mechanism 200. In the following, only the servo motor mechanism will be explained. The servo motor mechanism 200 is supported on a frame 3, and comprises a servo motor portion 201, a spindle 202 and cylinder 203 extended downwardly from the servo motor portion. A male screw provided at an outer periphery of the spindle 202 meshes with a female screw of the cylinder portion 203. The cylinder portion 203 vertically slidably passes a hub portion 204 attached to a central hole of the frame 3 by a key 205. A shank 107 is connected to a lower end of the cylinder 203.

Since the construction of the servo motor is well known, detailed explanation thereof is omitted. The servo motor generally comprises three constituent parts: a motor, an encoder, and a driver. Rotations of the servo motor are converted to vertically linear motions through screwing between the spindle 202 and the cylinder portion. In this embodiment, the servo motor 200 is set and controlled to function as the pull-up cylinder mechanism 104-1 and the low-pressure pressing cylinder 104-3 in the sixth embodiment. As to details of the function, see that of the sixth embodiment.

What is claimed is:

1. A heating-type vacuum press apparatus, comprising:
   (1) a base;

(2) a workpiece-receiving table arranged on the base and equipped with a heater;
(3) a lower fixed frame arranged on the base such that the lower fixed frame surrounds the receiving table, while being spaced from the receiving table;
(4) a press plate opposed to the receiving table and equipped with a heater;
(5) a fitting plate from which the press plate is hanged;
(6) a fitting plate/press plate driving mechanism adapted for vertically moving the fitting plate and the press plate and pressing the press plate on the workpiece on the receiving table by moving down the fitting plate and the press plate;
(7) an upper movement frame hanged from the fitting plate such that the upper movement frame surrounds the press plate, while being spaced from the press plate, open end faces of the upper movement frame and the lower fixed frame being opposed to each other, and the upper movement frame being approachable to or space from the lower fixed frame;
(8) a gas-tight sliding mechanism for ensuring gas-tightness between the lower fixed frame and the upper movement frame, an isolation chamber being defined by the lower fixed frame, the upper movement frame, the base and the fitting plate through the gas-tight sliding mechanism;
(9) a sliding mechanism for driving the gas-tight sliding mechanism, the sliding mechanism sliding the gas-tight sliding mechanism to form the isolation chamber; and
(10) a suction hole opened to the isolation chamber and adapted to be connected to a vacuum device, the isolation chamber being sucked to vacuum via the suction hole; and
wherein a first supporting rod supports the receiving table equipped with the heater while the receiving table is spaced from the base, and a second supporting rod supports the press plate equipped with the heater while the press plate is spaced from the fitting plate.

2. The heating-type vacuum press apparatus set forth in claim 1, wherein the press plate is connected to the fitting/press plate driving unit when the pressing plate is pressed downwardly, the fitting plate and the upper movement plate follow accordingly and are moved downwardly, the open end face of the upper movement frame is butted with that of the lower fixed plate at a pressing position; then said driving unit further moves the press plate to press the workpiece; whereas when the driving unit pushes the pressing plate upwardly, the lower pressing plate upwardly moves the upper movement frame and the fitting plate.

3. The heating-type vacuum apparatus set forth in claim 2, wherein the fitting plate/press plate driving unit comprises a high thrusting unit and a low thrusting unit; when the press plate moves downwardly, the upper movement frame and the fitting plate move downwardly following the press plate, the open end face of the upper movement frame is butted to that of the lower fixed frame at a pressing position, the workpiece is pressed by further downwardly moving the push plate with the low thrusting unit, whereas after a vacuum state of the isolation chamber is broken, the high thrusting unit upwardly moves the press plate and the press plate upwardly moves the upper movement frame and the fitting plate.

4. The heating-type vacuum apparatus set forth in claim 2, wherein urging means upwardly urges the press plate so that when the press plate is brought into contact with the workpiece, the urging means may prevent weight of the press plate and the heater onto the workpiece under vacuum.

5. The heating-type vacuum apparatus set forth in claim 2, wherein the urging means is a balancer spring.

6. The heating-type vacuum press apparatus set forth in claim 4, wherein the high thrusting unit and the low thrusting unit are a high thrusting cylinder mechanism and a low thrusting cylinder mechanism, respectively, the urging means is a back pressure cylinder mechanism, and the high thrusting cylinder mechanism, the low thrusting cylinder mechanism and the back pressure cylinder mechanism are arranged coaxially.

7. The heating-type vacuum press apparatus set forth in claim 5, wherein said driving unit is a servo motor mechanism.

8. The heating-type vacuum press apparatus set forth in claim 1, wherein a stepped portion is provided at an outer portion of the open end face of either the lower fixed frame or the upper movement frame, and an end portion of the sliding frame is slid and brought into contact with said stepped portion.

9. The heating-type vacuum press apparatus set forth in claim 1, wherein the sliding mechanism is fitted to the base, and the sliding mechanism vertically moves the sliding frame via a connection rod.

10. A heating-type vacuum press apparatus, comprising:
(1) a base;
(2) a workpiece-receiving table arranged on the base and equipped with a heater;
(3) a lower fixed frame arranged on the base such that the lower fixed frame surrounds the receiving table, while being spaced from the receiving table;
(4) a press plate opposed to the receiving table and equipped with a heater;
(5) a fitting plate from which the press plate is hanged;
(6) a fitting plate/press plate driving mechanism adapted for vertically moving the fitting plate and the press plate and pressing the press plate on the workpiece on the receiving table by moving down the fitting plate and the press plate;
(7) an upper movement frame hanged from the fitting plate such that the upper movement frame surrounds the press plate, while being spaced from the press plate, open end faces of the upper movement frame and the lower fixed frame being opposed to each other, and the upper movement frame being approachable to or space from the lower fixed frame;
(8) a gas-tight sliding mechanism for ensuring gas-tightness between the lower fixed frame and the upper movement frame, an isolation chamber being defined by the lower fixed frame, the upper movement frame, the base and the fitting plate through the gas-tight sliding mechanism;
(9) a sliding mechanism for driving the gas-tight sliding mechanism, the sliding mechanism sliding the gas-tight sliding mechanism to form the isolation chamber; and
(10) a suction hole opened to the isolation chamber and adapted to be connected to a vacuum device, the isolation chamber being sucked to vacuum via the suction hole; and
wherein said gas-tight sliding mechanism is a sliding frame body vertically slidable fitted around an outer peripheral face of either the lower fixed frame or the upper movement frame, said sliding mechanism is a sliding mechanism adapted to vertically slide the sliding frame body, gas tightness is ensured among the fixed frame, the sliding frame body and the upper movement frame by sliding the sliding frame body with the sliding mechanism, and the isolation chamber is formed in a space defined by the lower fixed frame body, the sliding frame, the upper movement frame, the base and the fitting plate;

wherein a first supporting rod supports the receiving table equipped with the heater while the receiving table is spaced from the base, and a second supporting rod supports the press plate equipped with the heater while the press plate is spaced from the fitting plate; and wherein the receiving table and the lower fixed frame are placed on the base plate via a slide table, the sliding frame is vertically slidably fitted around an outer peripheral face of the lower fixed frame, and the slide table is movable by a slide table-moving unit between a workpiece-placing position where the workpiece is placed on the receiving table and a pressing-waiting position where the workpiece is to be pressed.

11. The heating-type vacuum press apparatus set forth in claim 10, wherein the receiving table, the lower fixed frame, the sliding frame and the table plate on the slide table are fixed as an assembled unit to the slide table-moving unit, and the assembled unit is movable between the workpiece-placing position and the pressing-waiting position by the slide table-moving unit.

12. The heating-type vacuum press apparatus set forth in claim 11, wherein the table plate holds the connection rod on the base, the sliding mechanism is located under the base and has a pushing rod, and when said assembled unit comes to the pressing-waiting position, the connection rod upwardly moves the sliding frame via the pushing rod.

13. The heating-type vacuum press apparatus set forth in claim 1, wherein said gas-tight sliding mechanism comprises a gas-tight sliding portion provided at an upper end of the lower fixed frame and a gas-tight sliding portion provided at a corresponding lower end of the upper movement frame, said gas tightness is ensured between the lower fixed frame and the upper movement frame by gas-tightly sliding the gas-tight sliding portion of the upper end of the lower fixed frame with that of the lower end of the upper movement frame, and the fitting plate/press plate driving mechanism is used in combination as said driving unit.

14. The heating-type vacuum press apparatus set forth in claim 1, wherein said gas-tight sliding mechanism is a sliding frame body vertically slidable fitted around an outer peripheral face of either the lower fixed frame or the upper movement frame, said sliding mechanism is a sliding mechanism adapted to vertically slide the sliding frame body, gas tightness is ensured among the fixed frame, the sliding frame body and the upper movement frame by sliding the sliding frame body with the sliding mechanism, and the isolation chamber is formed in a space defined by the lower fixed frame body, the sliding frame, the upper movement frame, the base and the fitting plate.

15. The heating-type vacuum press apparatus set forth in claim 1, wherein a shape of an outer face of the lower fixed frame is almost identical with that of the upper movement frame, and an inner face of the sliding frame is gas-tightly slidable to the outer face of the lower fixed frame and that of the upper movement frame.

* * * * *